United States Patent
Watanabe

(10) Patent No.: US 11,356,576 B2
(45) Date of Patent: Jun. 7, 2022

(54) COMPUTER-READABLE MEDIUM, INFORMATION PROCESSING DEVICE, AND INFORMATION PROCESSING SYSTEM FOR CONTROL OF IMAGE PROCESSING DEVICE

(71) Applicant: Genki Watanabe, Tokyo (JP)

(72) Inventor: Genki Watanabe, Tokyo (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 16/896,487

(22) Filed: Jun. 9, 2020

(65) Prior Publication Data

US 2020/0412901 A1 Dec. 31, 2020

(30) Foreign Application Priority Data

Jun. 25, 2019 (JP) .............................. JP2019-117565
Feb. 18, 2020 (JP) .............................. JP2020-025592

(51) Int. Cl.
*G06F 3/12* (2006.01)
*H04N 1/00* (2006.01)
(Continued)

(52) U.S. Cl.
CPC ....... *H04N 1/00973* (2013.01); *G06F 21/602* (2013.01); *H04N 1/00867* (2013.01); *H04W 76/10* (2018.02)

(58) Field of Classification Search
None
See application file for complete search history.

(56) References Cited

U.S. PATENT DOCUMENTS 8,976,391 B2* 3/2015 Nanaumi ............. G06K 15/405
                                                  358/1.15
9,489,163 B2* 11/2016 Lee ....................... G06F 3/1268
(Continued)

FOREIGN PATENT DOCUMENTS

| JP | 2014-100887 | 6/2014 |
| JP | 2015-159533 | 9/2015 |
| JP | 2018-106410 | 7/2018 |

OTHER PUBLICATIONS

U.S. Appl. No. 16/655,490, filed Oct. 17, 2019.

*Primary Examiner* — Dung D Tran
(74) *Attorney, Agent, or Firm* — Harness, Dickey & Pierce, P.L.C.

(57) ABSTRACT

A non-transitory computer-readable medium includes programmed instructions that cause a computer to function as a wireless communication control unit, a device information acquisition unit, an information acquisition unit, and an information providing unit. The wireless communication control unit is configured to control a wireless communication unit so as to connect to an image forming device by wireless communication. The device information acquisition unit is configured to acquire unique device information from the image forming device through the wireless communication control unit. The information acquisition unit is configured to acquire, from a server device, predetermined information to be supplied to the image forming device specified by the acquired device information. The information providing unit is configured to provide the information acquired from the server device to the image forming device through the wireless communication control unit.

17 Claims, 23 Drawing Sheets

(51) Int. Cl.
*G06F 21/60* (2013.01)
*H04W 76/10* (2018.01)

(56) References Cited

U.S. PATENT DOCUMENTS

| | | | |
|---|---|---|---|
| 2006/0109505 A1* | 5/2006 | Ha | H04N 1/00307 |
| | | | 358/1.15 |
| 2012/0084767 A1* | 4/2012 | Ishimoto | G06F 8/65 |
| | | | 717/173 |
| 2015/0212769 A1 | 7/2015 | Norota et al. | |
| 2017/0017439 A1* | 1/2017 | Kang | G06F 3/1211 |
| 2017/0134609 A1* | 5/2017 | Park | H04N 1/32117 |
| 2017/0147322 A1* | 5/2017 | Vopni | G06F 8/65 |
| 2017/0286087 A1* | 10/2017 | Naota | H04N 1/0097 |
| 2018/0181452 A1 | 6/2018 | Yamawaki et al. | |
| 2018/0341434 A1* | 11/2018 | Han | G06F 3/1231 |
| 2019/0265963 A1 | 8/2019 | Watanabe | |
| 2020/0012547 A1 | 1/2020 | Yamawaki et al. | |
| 2020/0117402 A1* | 4/2020 | Morishita | G06F 3/1234 |

\* cited by examiner

COMPUTER-READABLE MEDIUM, INFORMATION PROCESSING DEVICE, AND INFORMATION PROCESSING SYSTEM FOR CONTROL OF IMAGE PROCESSING DEVICE

CROSS-REFERENCE TO RELATED APPLICATIONS

The present application claims priority under 35 U.S.C. § 119 to Japanese Patent Application No. 2019-117565, filed Jun. 25, 2019 and Japanese Patent Application No. 2020-025592, filed on Feb. 18, 2020. The contents of each of which are incorporated herein by reference in their entirety.

BACKGROUND OF THE INVENTION

1. Field of the Invention

The present invention relates to an computer readable medium, an information processing device, and an information processing system.

2. Description of the Related Art

At present, a communication system for transmitting setting information for network communication from a portable terminal such as a smartphone to a printer device through near-field communication and setting the setting information to the printer device has been known. The printer device sets network communication based on the setting information received from the portable terminal. In this manner, the printer device can receive printing setting information through a network, and perform printing with setting corresponding to the received printing setting information.

In a printer system disclosed in Japanese Unexamined Patent Application Publication No. 2014-100887, a network communication unit in a printer device establishes an external network communication line with a computer device. A control unit in the printer device acquires second setting information from the computer device through the established external network communication line, and performs printing processing based on printing setting information included in the acquired second setting information. Such a printer system can easily set information for adapting the printer device to use environments by using external network communication.

In the conventional communication system and the printer system in Japanese Unexamined Patent Application Publication No. 2014-100887, however, the device side such as the printer device needs to acquire setting information by establishing an external network communication line with a computer device that distributes the setting information. Thus, when a device such as the printer device is stand-alone and can connect to only an internal network, there is a problem in that it is difficult to acquire and set setting information from a computer device that distributes the setting information.

In other words, the conventional communication system and the printer system in Japanese Unexamined Patent Application Publication No. 2014-100887 have a problem in that it is difficult to acquire and set setting information from a computer device that distributes the setting information through an external network unless the device can connect to the external network.

SUMMARY OF THE INVENTION

According to an aspect of the present invention, a non-transitory computer-readable medium includes programmed instructions that cause a computer to function as a wireless communication control unit, a device information acquisition unit, an information acquisition unit, and an information providing unit. The wireless communication control unit is configured to control a wireless communication unit so as to connect to an image forming device by wireless communication. The device information acquisition unit is configured to acquire unique device information from the image forming device through the wireless communication control unit. The information acquisition unit is configured to acquire, from a server device, predetermined information to be supplied to the image forming device specified by the acquired device information. The information providing unit is configured to provide the information acquired from the server device to the image forming device through the wireless communication control unit.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
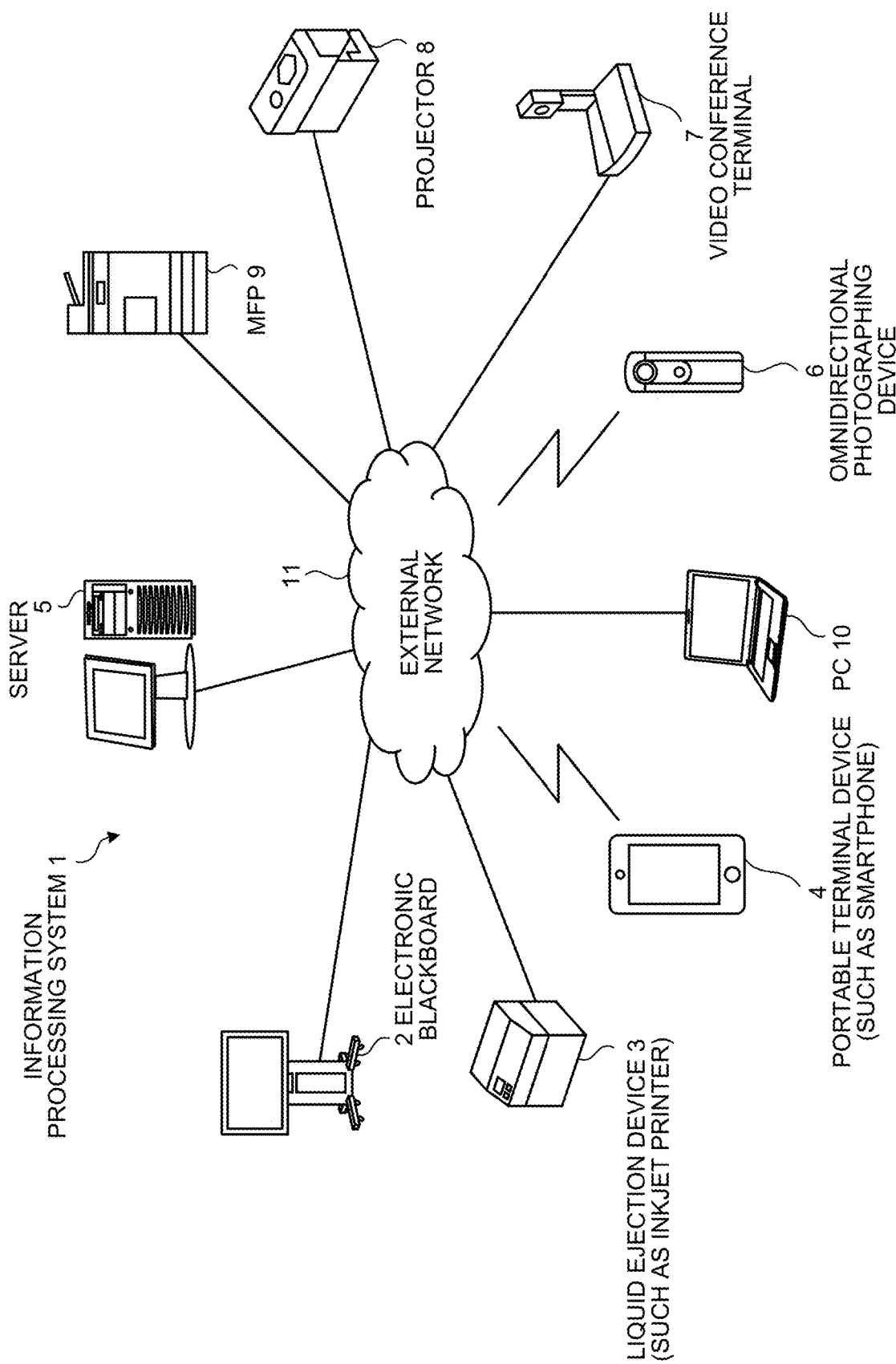
FIG. 1 is a diagram illustrating a system configuration of an information processing system in a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An embodiment has an object to provide an information processing program, an information processing device, an information processing system capable of acquiring information and providing the information to an image forming device even under environments where connection to an external network connected to a server device that distributes the information is difficult.

An information processing system according to embodiments is described below with reference to the accompanying drawings.

First Embodiment

System Configuration

FIG. 1 is a diagram illustrating a system configuration of an information processing system in a first embodiment. As illustrated in FIG. 1, an information processing system 1 in the first embodiment is configured by mutually connecting a plurality of devices through an external network 11 such as the Internet. In one example, as the devices, an electronic blackboard 2, a liquid ejection device (such as inkjet printer device) 3, a portable terminal device 4 such as a smartphone, a server device 5, and an omnidirectional photographing device 6 can be applied. As the devices, a video conference terminal device 7, a projector device 8, a multifunction peripheral (MFP) 9, and a personal computer device 10 can be applied.

The multifunction peripheral 9 is a device having a plurality of image forming functions, such as a copying function and a scanner function. The personal computer device 10 may be either of a desktop or notebook personal computer device.

In the information processing system in the embodiment, the portable terminal device 4 is connected to any of the above-mentioned devices by wireless communication by a device setting tool installed on the portable terminal device 4, and it is determined based on unique information on the device whether the portable terminal device 4 has already held information to be supplied to the device, such as setting information. When the portable terminal device 4 has held the information, the held information is transferred from the portable terminal device 4 to the device. In this manner, the information received from the portable terminal device 4 is made to be reflected in the device. Consequently, even under environments where it is difficult for the device to connect to an external network, the device can complete the setting based on the information received from the portable terminal device 4.

On the other hand, when information for a device to be set is not included in the portable terminal device 4, the portable terminal device 4 acquires information from, for example, the server device 5 that distributes the information, and transfers the information to the device. Consequently, similarly to the above, the device can complete the setting based on the information received from the portable terminal device 4 even under environments where it is difficult for the device to connect to an external network.

As a "device" as a transfer destination of information acquired by the portable terminal device 4, any device can be used. As information transferred from the portable terminal device 4 to a device, any information such as setting information and predetermined processing information can be used. In addition, as a distribution source of information acquired by the portable terminal device 4, any device connected to the external network 11, such as the server device 5 and the personal computer device 10, can be used.

Now, an example in which the portable terminal device 4 acquires setting information for the MFP 9 from the server device 5, transfers the setting information to the MFP 9, and completes predetermined setting of the MFP 9 is described. The portable terminal device 4 is an example of an information processing device, and the MFP 9 is an example of an image forming device. The setting information is an example of predetermined information distributed by the server device.

Hardware Configuration

Figure 2:
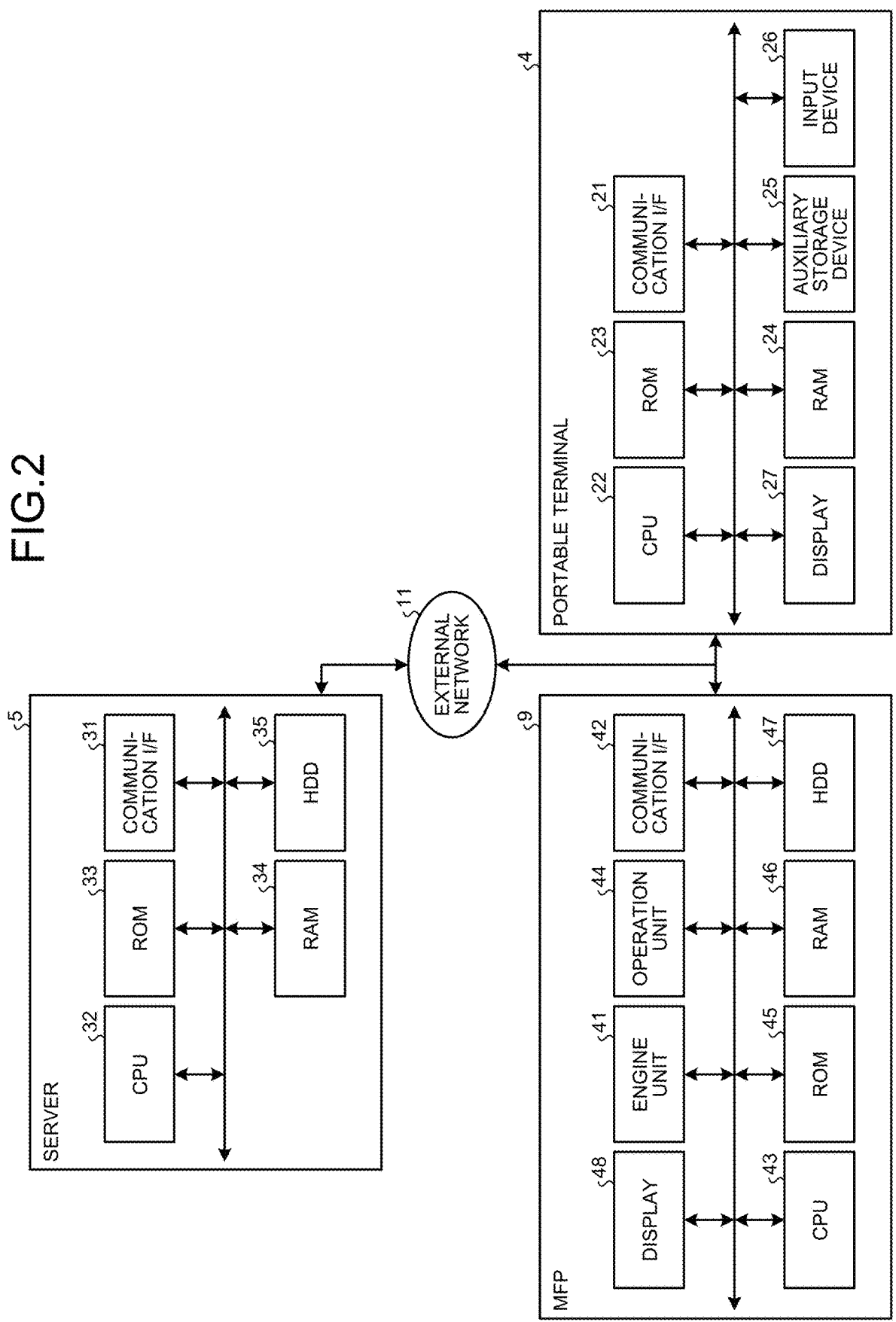
FIG. 2 is a diagram illustrating simple hardware configurations of a portable terminal device, a server device, and an MFP provided in the information processing system in the first embodiment.

FIG. 2 is a diagram illustrating simple hardware configurations of the portable terminal device 4, the server device 5, and the MFP 9.

Hardware Configuration of Portable Terminal Device

In FIG. 2, as the portable terminal device 4, for example, a smartphone or a tablet terminal device can be used. The portable terminal device 4 includes a communication I/F 21, a center processing unit (CPU) 22, a read only memory (ROM) 23, a random access memory (RAM) 24, an auxiliary storage device 25, an input device 26, and a display 27. The input device 26 and the display 27 are integrated as what is called "touch panel", and configured to detect contact operation of a user.

In a storage unit such as the ROM 23, the RAM 24, or the auxiliary storage device 25, a portable terminal information processing program for performing information processing to acquire predetermined information such as setting information from the server device 5 and transfer the information to the MFP 9 is stored. Details are described later.

Hardware Configuration of Server Device

In FIG. 2, the server device 5 includes a communication I/F 31, a CPU 32, a ROM 33, a RAM 34, and a hard disc drive (HDD) 35. In a storage unit such as the ROM 33, the RAM 34, or the HDD 35, an information processing program for the server device is stored. When requested by the portable terminal device 4 to acquire information transferred to the MFP 9, the CPU 32 transmits information transferred to the MFP 9 to the portable terminal device 4 based on the information processing program for the server device. Details are described later. Note that FIG. 2 illustrates only one server device 5, but a plurality of server devices may operate.

Hardware Configuration of MFP

In FIG. 2, the MFP 9 includes an engine unit 41, a communication I/F 42, a CPU 43, an operation unit 44, a ROM 45, a RAM 46, an HDD 47, and a display 48. The MFP 9 includes, for example, a scanner for scanning and reading an image of a document, a plotter for printing on a sheet material such as paper, and a facsimile communication unit for performing facsimile communication. In addition thereto, the MFP 9 may be provided with certain options such as a finisher device for sorting printed sheet materials and an automatic document feeder (ADF) for automatically feeding documents.

The communication I/F 42 includes at least two kinds of interfaces, that is, an interface for connecting to an external network and an interface for connecting to a wireless communication network. The engine unit 41 is hardware for implementing a copying function, a scanner function, a facsimile function, and a printer function. The operation unit 44 and the display 48 are integrated as what is called "touch panel". The operation unit 44 receives various kinds of inputs corresponding to operation of a user. The display 48 displays various kinds of information such as information corresponding to received operation, information indicating operation conditions of the MFP 9, and setting states.

The CPU 43 executes a computer program stored in the storage unit such as the ROM 45, the RAM 46, and the HDD 47 to implement various kinds of functions of a copying function, a scanner function, a facsimile function, and a printer function. In the storage unit such as the ROM 45, the RAM 46, and the HDD 47, an information processing program for the MFP is stored. The CPU 43 executes the information processing program for the MFP to perform information processing for reflecting setting information acquired and transferred from the server device 5 by the portable terminal device 4, in the MFP 9. Details are described later.

Software Configuration

Next, software configurations of the portable terminal device 4, the server device 5, and the MFP 9 are described with reference to FIG. 3.

Software Configuration of Portable Terminal Device

Figure 3:
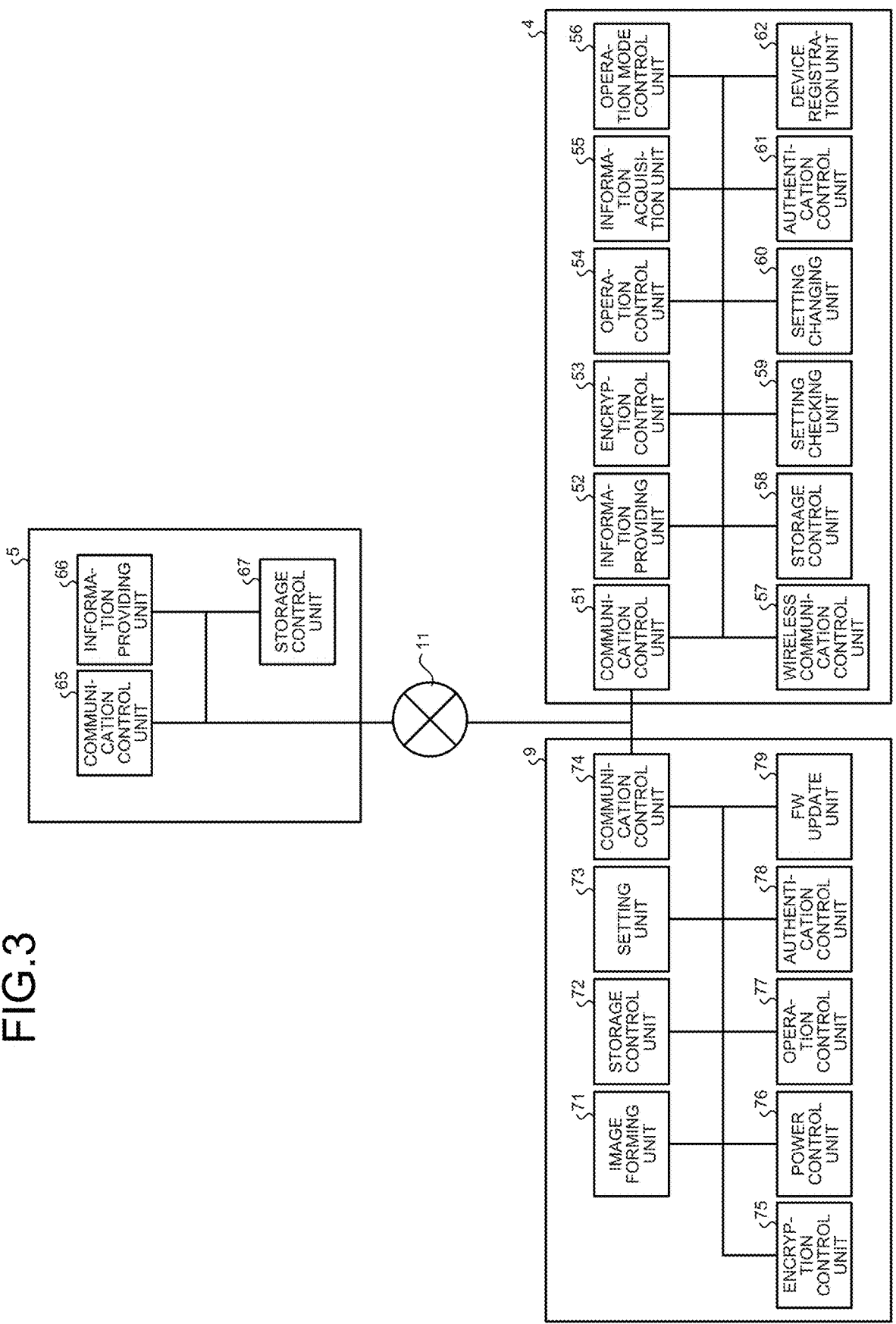
FIG. 3 is a diagram illustrating software configurations of the portable terminal device, the server device, and the MFP provided in the information processing system in the first embodiment.

In FIG. 3, the CPU 22 in the portable terminal device 4 executes the information processing program for the portable terminal stored in the storage unit to implement functions of a communication control unit 51, an information providing unit 52, an encryption control unit 53, an operation control unit 54, an information acquisition unit 55, an operation mode control unit 56, a wireless communication control unit 57, and a storage control unit 58. The CPU 22 in the portable terminal device 4 executes the information processing program for the portable terminal stored in the storage unit to implement functions of a setting checking unit 59, a setting changing unit 60, an authentication control unit 61, and a device registration unit 62. The wireless communication control unit 57 serves as a wireless communication control unit and a device information acquisition unit as well.

Although details are described later, the operation control unit 54 displays screens and receives user operation. The communication control unit 57 controls the communication I/F 21 so as to communicate with the server device 5 through the external network 11 and communicate with the portable terminal device 4 through a wireless communication network. For example, the storage control unit 58 stores and controls setting information, firmware, various kinds of use data, an address book, or stored image data in the above-mentioned storage unit.

The information providing unit 52 transmits setting information acquired from the server device 5 to the MFP 9. The information providing unit 52 transmits various kinds of information such as information on each user registered in the address book and stored image information to the MFP 9. The setting checking unit 59 checks the range, the data type, and the presence/absence of setting items in the setting information transmitted to the MFP 9. When the setting change on the portable terminal device 4 is allowed, the setting changing unit 60 receives operation to change a predetermined item in the setting information. The information acquisition unit 55 acquires use information from the MFP 9, and acquires setting information on the MFP 9 from the server device 5.

The device registration unit 62 stores (registers) unique information such as a device identification number of the MFP 9 connected to the network in the above-mentioned storage unit. For example, the wireless communication control unit 57 controls wireless communication between the portable terminal device 4 and the MFP 9 by Wi-Fi Direct, Bluetooth (trademark), or near-field communication (NFC). The authentication control unit 61 controls user authentication.

Software Configuration of Server Device

Next, in FIG. 3, the CPU 32 in the server device 5 executes an information processing program for the server device 5 stored in the storage unit to implement a communication control unit 65, an information providing unit 66, and a storage control unit 67. The communication control unit 65 controls communication between the server device 5 and the portable terminal device 4 and between the server device 5 and the MFP 9 performed through the communication I/F 31. The information providing unit 66 provides predetermined information on the MFP 9, such as setting information, through the portable terminal device 4. The storage control unit 67 controls writing and reading of various kinds of information such as the setting information to and from the storage unit.

Software Configuration of MFP

Next, in FIG. 3, the CPU 43 in the MFP 9 executes an information processing program for the MFP 9 stored in the storage unit to implement functions of an image forming unit 71, a storage control unit 72, a setting unit 73, a communication control unit 74, an encryption control unit 75, a power control unit 76, an operation control unit 77, an authentication control unit 78, and a firmware update unit (FW update unit) 79.

The image forming unit 71 executes various kinds of functions of the MFP 9, such as a printer function, a copying function, a scanning function, and a facsimile transmission and reception function, to form images. The communication control unit 74 controls the communication I/F 42 such that the MFP 9 communicates with the server device 5 and communicates with the portable terminal device 4. The setting unit 73 sets various kinds of setting values of the MFP 9. The setting unit 73 authenticates the presence/absence of change authority or the data format for each setting value. The setting unit 73 outputs use information on the MFP 9.

For example, the storage control unit 72 stores and controls setting information, firmware, various kinds of use data, an address book, or stored image data in the above-mentioned storage unit. The firmware update unit (FW update unit) 79 updates firmware stored in the storage unit such as the ROM 45 with newly acquired firmware for updating. The authentication control unit 78 performs user authentication to check the setting change authority from the current authentication state, and determines whether the MFP 9 can be set. The operation control unit 77 controls displaying on the display 48 and receives operation from users.

The power control unit 76 performs start control, shutdown control, shift control to an energy saving mode, and resume control of the MFP 9. The power control unit 76 resumes the operation mode from the energy saving state to a normal operation mode, for example, when a panel is touched by the user, predetermined time is counted by a timer, or when an external access is made through a network. The encryption control unit 75 encrypts and decrypts setting information acquired from the portable terminal device 4 or the server device 5.

Note that the communication control unit 51 to the device registration unit 62 in the portable terminal device 4, the communication control unit 65 to the storage control unit 67 in the server device 5, and the image forming unit 71 to the FW update unit 79 in the MFP 9 in FIG. 3 are implemented by software by the information processing programs. However, the whole or part of these units may be implemented by hardware such as an integrated circuit (IC).

Each information processing program may be recorded and provided in a computer device-readable recording medium such as a CD-ROM or a flexible disk (FD) as file information in an installable format or an executable format. Each information processing program may be recorded and provided in a computer device-readable recording medium such as a CD-R, a digital versatile disc (DVD), a Blu-ray (trademark) disc, or a semiconductor memory. Each information processing program may be provided by being installed through a network such as the Internet. Each information processing program may be provided by being incorporated in a ROM in a device in advance.

Next, operations of the information processing system in the embodiment having such configurations are described.

Setting Operation of Setting Information

Figure 4:
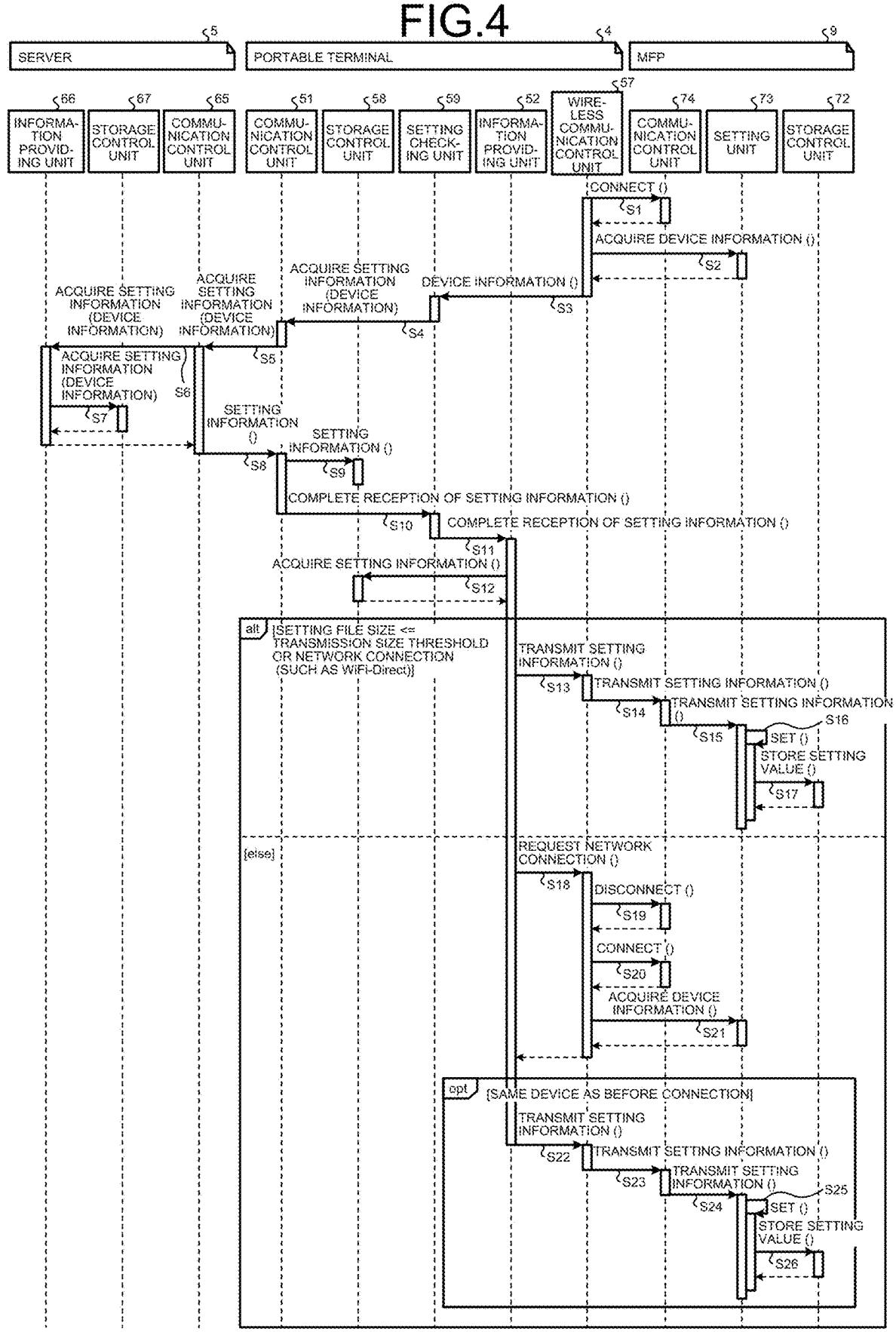
FIG. 4 is a sequence diagram illustrating the flow of operation to set setting information to the MFP in the information processing system in the first embodiment.

First, FIG. 4 is a sequence diagram illustrating the flow for the portable terminal device 4 to set setting information acquired from the server device 5 to the MFP 9. In this case, the wireless communication control unit 57 in the portable terminal device 4 performs wireless communication connection to the MFP 9 through the communication I/F 21 (Step S1), and acquires unique device information from the MFP 9 (Step S2).

Next, the setting checking unit 59 in the portable terminal device 4 is an example of an information acquisition unit, and transfers the device information acquired from the MFP 9 to the server device 5 and makes a request to acquire the setting information (Step S3 to Step S5). The information providing unit 66 in the server device 5 transmits setting information for the MFP 9 corresponding to the received device information to the portable terminal device 4 (Step S6 to Step S8). The storage control unit 58 in the portable terminal device 4 stores the setting information acquired from the server device 5 in the storage unit (Step S9 to Step S12).

Next, the information providing unit 52 in the portable terminal device 4 determines whether the volume (file size) of the setting information acquired from the server device 5 is less than a normal information volume (less than threshold). The information providing unit 52 determines whether the volume of the setting information acquired from the server device 5 is an information volume that can be transferred without taking a long time with a communication scheme used for transmitting the setting information to the MFP 9, such as Wi-Fi (trademark) Direct.

When the volume of the setting information acquired from the server device 5 is less than a normal information volume or equal to or less than a wireless communication capacity of the wireless communication scheme in use, the information providing unit 52 transmits the setting information acquired from the server device 5 to the MFP 9 through the wireless communication control unit 57 by wireless (Step S13 to Step S15). The setting unit 73 in the MFP 9 stores the setting information transmitted from the portable terminal device 4 by wireless in the storage unit, and sets and reflects the setting information in the MFP 9 at a predetermined timing, for example, at the time of activation of the MFP 9 or before the shift to a sleep mode (Step S16 and Step S17).

In one example, the CPU 43 in the MFP 9 shifts to a setting mode at timing at which setting information is received from the portable terminal device 4, and in this setting mode, changes or registers the value of each item corresponding to the setting information. When the setting is completed, the CPU 43 in the MFP 9 notifies each unit of the setting change. When the setting is completed, the CPU 43 in the MFP 9 cancels the setting mode and shifts to a normal mode. By reflecting the setting after shifting to the setting mode, a malfunction that processing such as printing is performed during setting and a printed matter with unintended setting is output can be prevented.

On the other hand, when the volume of the setting information acquired from the server device 5 is equal to or more than a normal information volume or when it is predicted that it takes a long time to transmit setting information with the currently used communication scheme, the information providing unit 52 performs processing for disconnecting the communication line in the current communication scheme through the wireless communication control unit 57 (Step S18 to Step S20). The information providing unit 52 acquires device information from the MFP 9 (Step S21), establishes a wireless communication line in a communication scheme capable of large-volume communication such as Wi-Fi (trademark) Direct with the MFP 9, and transmits setting information acquired from the server device 5 to the MFP 9 (Step S22 to Step S24). The MFP 9 performs setting based on the setting information received from the portable terminal device 4 by wireless communication (Step S25 and Step S26).

Effects in First Embodiment

In the case of the information processing system in the first embodiment, the portable terminal device 4 acquires setting information corresponding to device information from the server device 5 in advance, and transmits and sets the setting information to the MFP 9 by wireless communication such as Wi-Fi (trademark) Direct. Consequently, even when the MFP 9 is difficult to connect to the external network control unit 11 such as the Internet, the MFP 9 can be set.

The time required for completing the setting of the MFP 9 on site (installed location) (on-duty hours) is time obtained by adding the time required for setting connection to the external network 11, the time required for the MFP 9 to receive setting information from the server device 5, and the time required for reflecting the received setting information in the MFP 9. Thus, if the connection setting of the external network 11 is not completed, it is difficult to receive setting information from the server device 5, and hence the time required for completing the setting based on the setting information is increased.

However, in the case of the information processing system in the first embodiment, the connection setting of the MFP 9 to the external network 11 can be eliminated, and hence the time required for completing the setting of the MFP 9 can be significantly reduced.

Second Embodiment

Next, an information processing system in a second embodiment is described. The example in the above-mentioned first embodiment is an example in which the portable terminal device 4 acquires only setting information corresponding to device information on the MFP 9 from the server device 5. The second embodiment is, on the other hand, an example in which the portable terminal device 4 acquires setting information for each model of the MFP 9 from the server device 5 in advance, and selectively transmits and sets setting information corresponding to the connected MFP 9.

Figure 5:
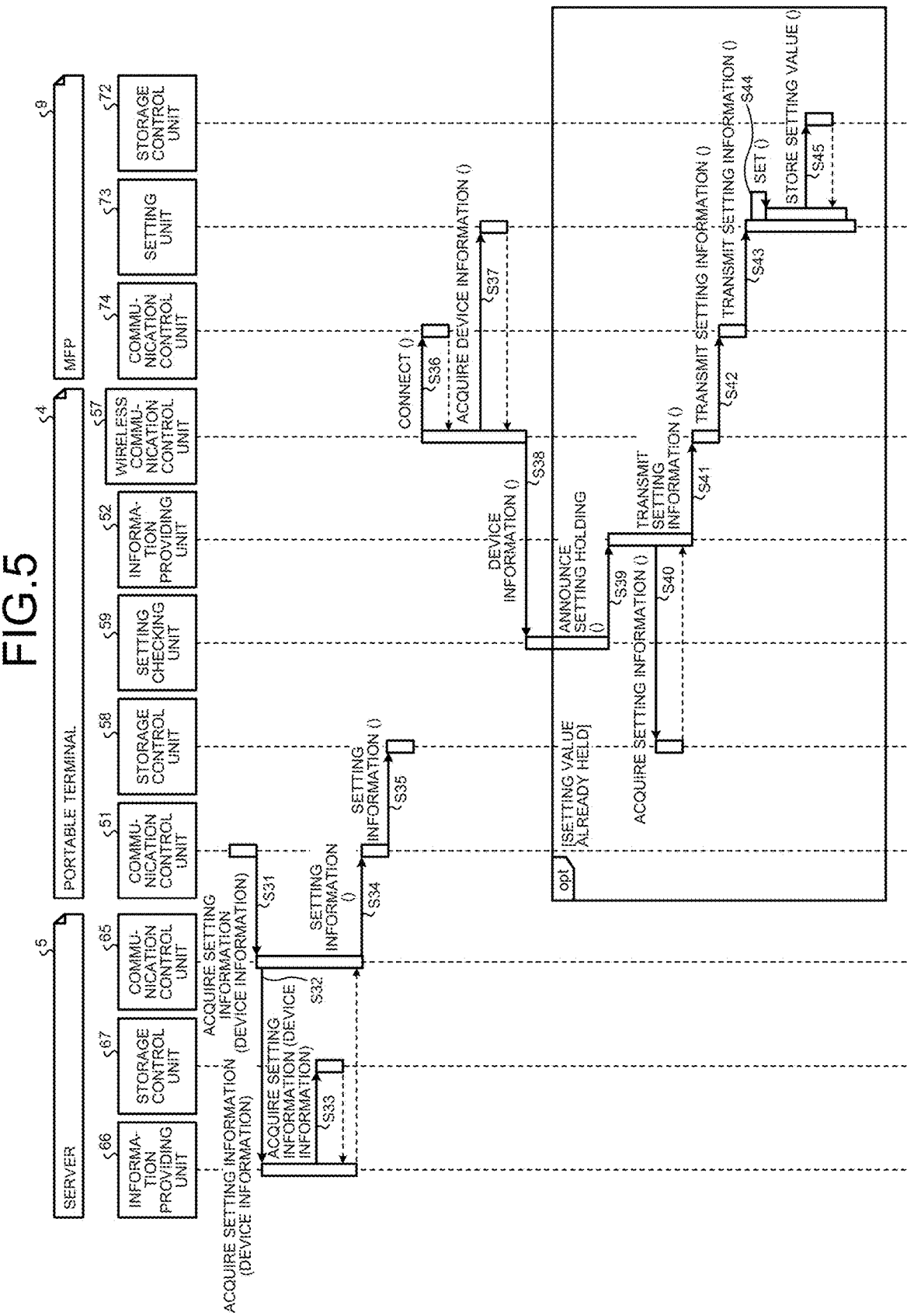
FIG. 5 is a sequence diagram illustrating the flow of operation to set setting information to the MFP in an information processing system in a second embodiment.

FIG. 5 is a sequence diagram illustrating the flow for the portable terminal device 4 to selectively set setting information for each model to the MFP 9. In this case, the portable terminal device 4 acquires setting information for each model of the MFP 9 from the server device 5 in advance, and stores the setting information in the storage unit (Step S31 to Step S35). When the wireless communication control unit 57 in the portable terminal device 4 connects a wireless communication line such as Wi-Fi (trademark) Direct to the MFP 9 (Step S36), the wireless communication control unit 57 acquires unique device information from the MFP 9 (Step S37 and Step S38).

The information providing unit 52 in the portable terminal device 4 acquires, from the storage unit, setting information corresponding to the device information acquired from the MFP 9 among the setting information for each model acquired from the server device 5 (Step S39, Step S40, and Step S41). The wireless communication control unit 57 transmits the setting information corresponding to the device information to the MFP 9 (Step S42 to Step S43). The MFP 9 completes the setting based on the setting information transmitted from the portable terminal device 4 (Step S44 and Step S45).

In this manner, an effect that the portable terminal device 4 can acquire setting information for a plurality of models from the server device 5 such that setting corresponding to the model of the MFP 9 can be performed as well as the same effects as in the above-mentioned first embodiment can be obtained.

Third Embodiment

Figure 6:
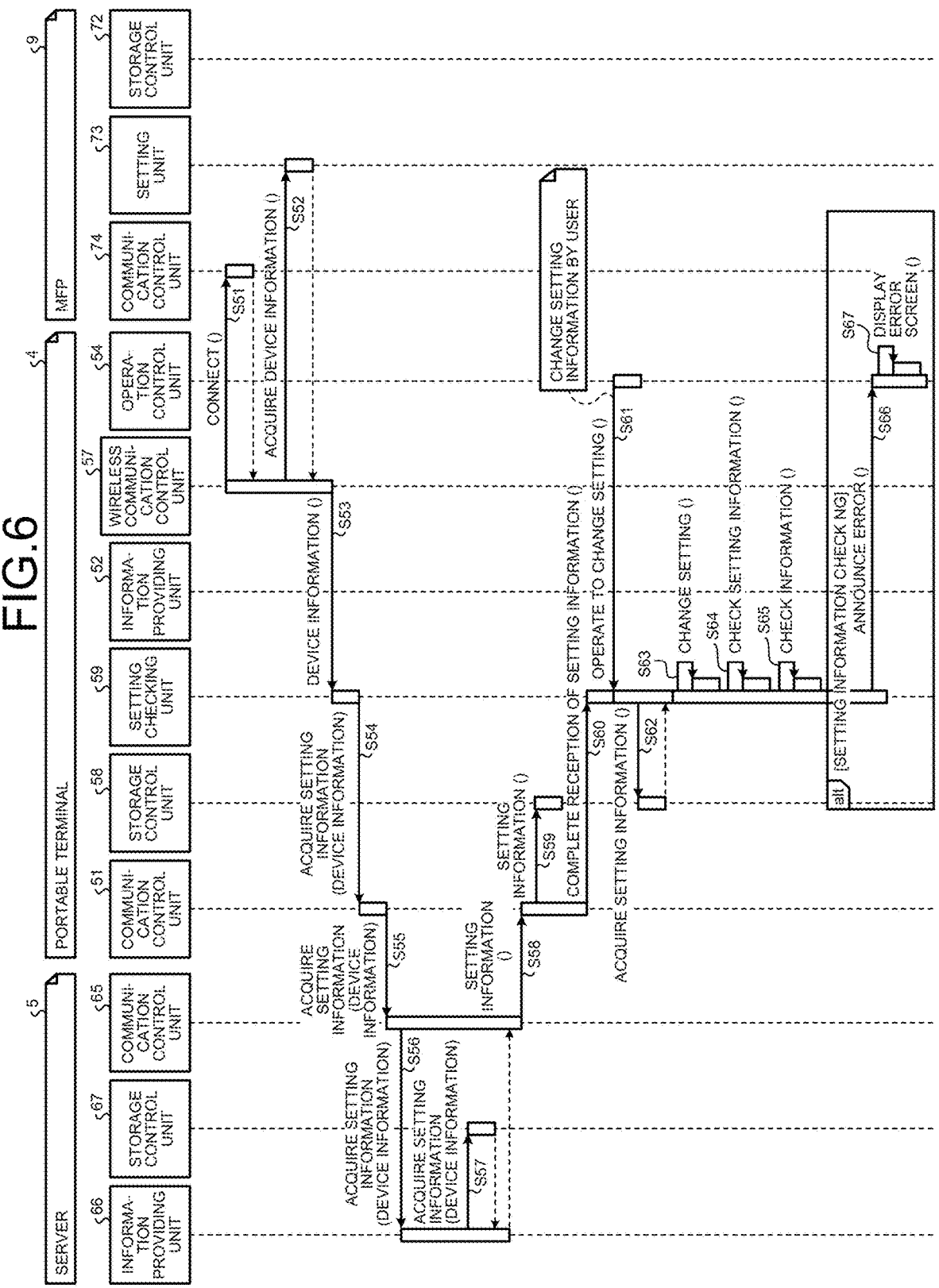
FIG. 6 is a diagram illustrating the flow of system operation corresponding to operation to change setting information by a user in an information processing system in a third embodiment.

Next, an information processing system in a third embodiment is described. The third embodiment is an example in which setting information on the MFP 9 acquired from the server device 5 can be changed by a user on the portable terminal device 4. FIG. 6 is a diagram illustrating the flow of system operation corresponding to operation to change setting information by a user. In FIG. 6, the portable terminal device 4 acquires setting information corresponding to device information on the MFP 9 from the server device 5 as described above (Step S51 to Step S60).

Figure 7:
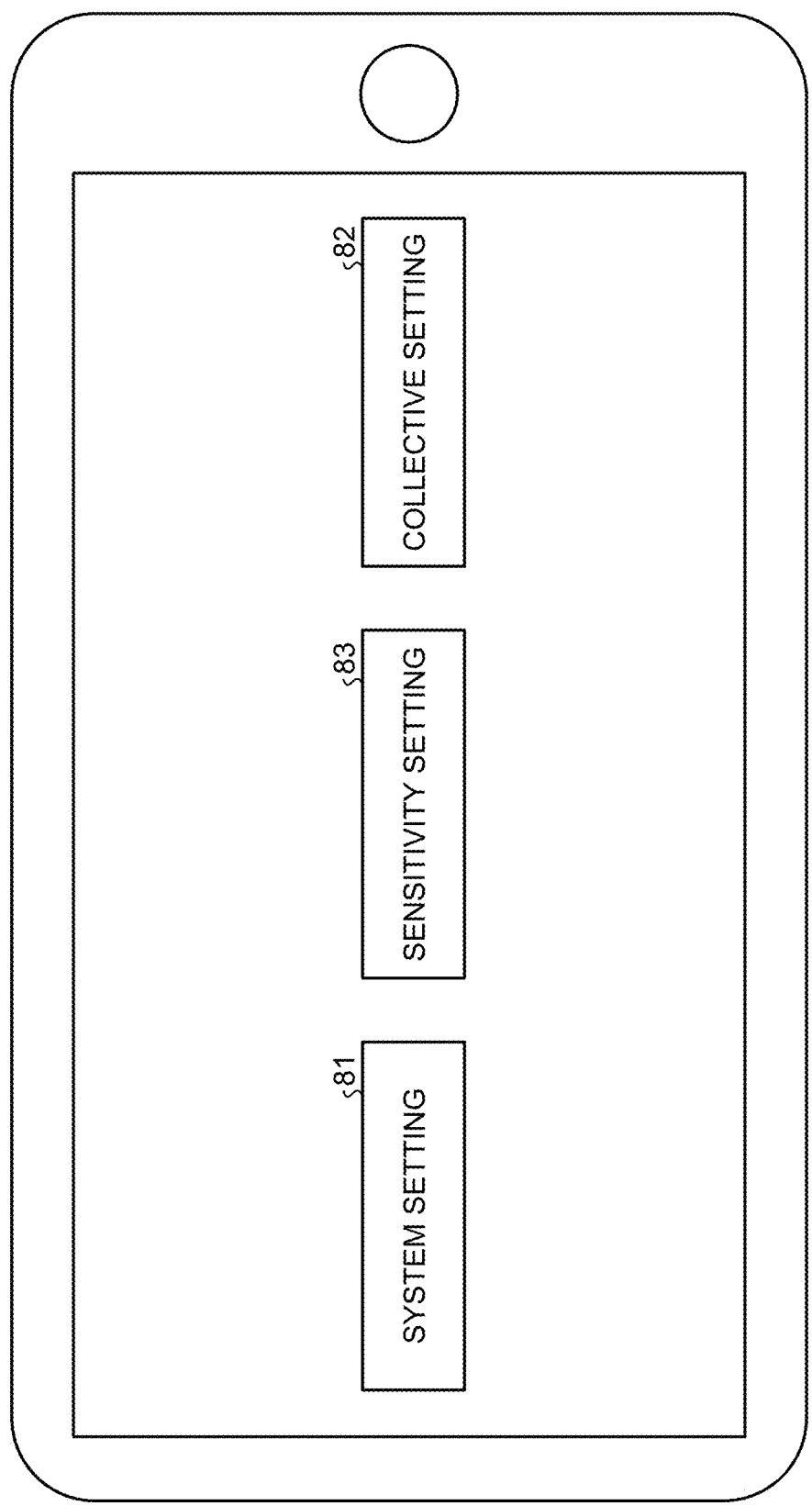
FIG. 7 is a diagram illustrating an example of a setting menu screen on the portable terminal device.

FIG. 7 is an example of a setting menu screen on the portable terminal device 4. As exemplified in FIG. 7, the setting menu screen on the portable terminal device 4 is provided with a system setting button 81 to be operated for displaying system setting items as well as a sensitivity setting button 83 and a collective setting button 82 described later. To change setting information, the user operates the system setting button 81. When detecting the operation of the system setting button 81, the operation control unit 54 notifies the setting checking unit 59 of the operation (Step S61). The setting checking unit 59 acquires the setting information acquired from the server device 5 through the storage control unit 58 (Step S62), reflects the setting information in a system setting screen, and displays the system setting screen on the display 27.

Figure 8:
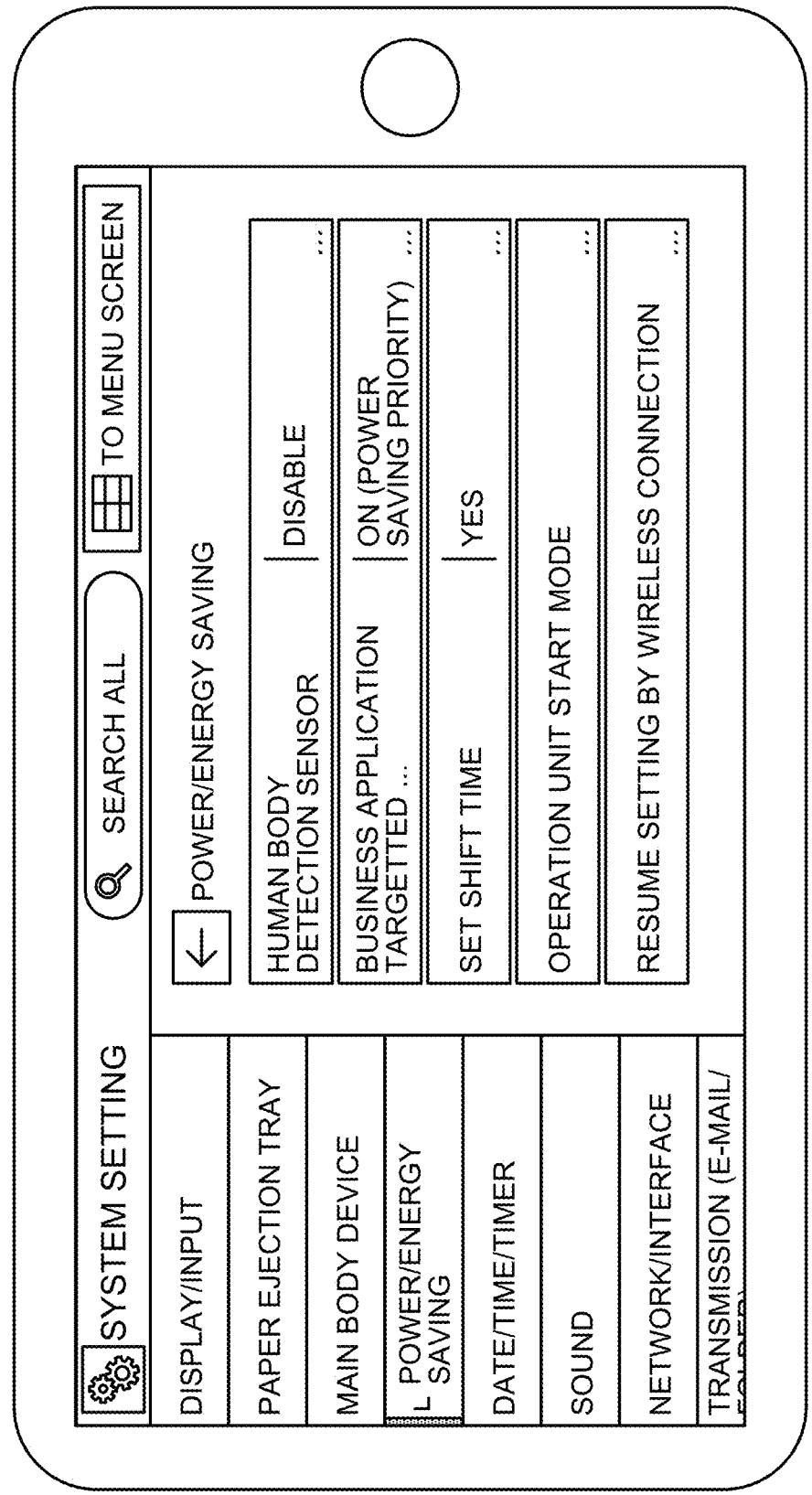
FIG. 8 is a diagram illustrating an example of a system setting screen on the portable terminal device.

FIG. 8 is an example of the system setting screen on which the setting information is reflected. In the example in FIG. 8, on the system setting screen, large items of display/input, paper ejection tray, main body device, date/time/timer, sound, network/interface, and transmission (e-mail/folder) are displayed. The user selects and operates a large item to be changed among the large items. The setting checking unit 59 has a configuration including the setting changing unit 60 (example of change control unit) illustrated in FIG. 3, and when a large item is selected and operated, displays and controls a pulldown menu of medium items included in the large item. When a desired item is selected from the pulldown menu by the user, the setting checking unit 59 displays small items included in the selected medium item.

The example in FIG. 8 is an example in which a medium item of power/energy saving is selected by the user from a large item of main body device. In this case, the setting checking unit 59 displays a small item for selecting enable/disable of a human body detection sensor, a small item for selecting on/off of energy saving resume for business application, and a small item for selecting whether to set shift time. The setting checking unit 59 changes setting information acquired from the server device 5 in response to operation of the large item, the medium item, and the small item on the system setting screen by the user (Step S63).

Next, the setting checking unit 59 (example of check unit) checks the changed setting information (Step S64 and Step S65). The setting information may be checked based on reference setting information for checking stored on the portable terminal device 4 side in advance. Alternatively, the setting information may be checked by acquiring reference setting information for checking from the server device 5 or the MFP 9.

Next, when an error such as erroneous input is detected as a result of the checking of the setting information, the setting checking unit 59 (example of display control unit) displays an error screen on the display 27 through the operation control unit 54 (Step S66 and Step S67). When an error is detected, the setting information is not transmitted to the MFP 9. When the error screen is displayed, the user performs desired operation to change the setting information based on the system setting screen illustrated in FIG. 8 again. When the setting information is checked again and the error is eliminated, the setting information is transmitted to the MFP 9. In this manner, the MFP 9 is set by the setting information changed by the user.

The information processing system in the third embodiment can obtain an effect that the MFP 9 can be set by setting information in which the intention of the user has been more reflected, as well as the same effects as in each of the above-mentioned embodiments.

Fourth Embodiment

Next, an information processing system in a fourth embodiment is described. The fourth embodiment is an example in which encrypted setting information is transmitted and received between the portable terminal device 4 and the server device 5 and between the portable terminal device 4 and the MFP 9 to improve the safety of the system. A flowchart in FIG. 9 indicates the flow of system operation for encrypting setting information and transmitting and receiving the encrypted setting information.

Figure 9:
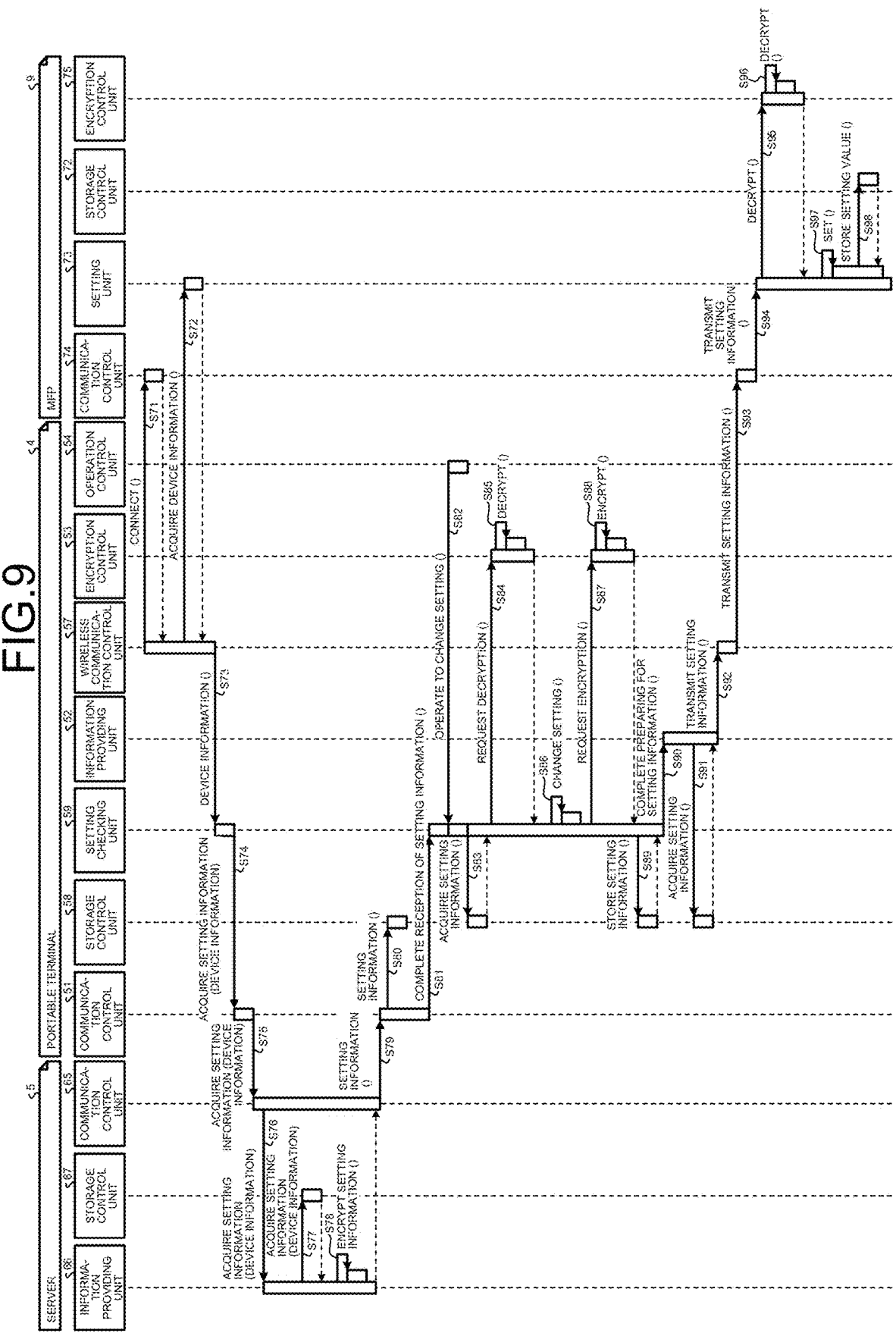
FIG. 9 is a flowchart illustrating the flow of operation to encrypt setting information and transmit and receive the encrypted setting information in an information processing system in a fourth embodiment.

In the flowchart in FIG. 9, when the server device 5 receives device information on the MFP 9 from the portable terminal device 4 (Step S71 to Step S76), the information providing unit 66 performs predetermined encryption on setting information corresponding to the received device information (Step S77 and Step S78), and transmits the setting information to the portable terminal device 4 through the communication control unit 65 (Step S79).

When instructed to change the setting information from a user, the encryption control unit 53 in the portable terminal device 4 performs decryption processing of the setting information received from the server device 5 (Step S81 to Step S85). The setting checking unit 59 performs changing processing instructed from the user on the decrypted setting information, and issues an encryption request to the encryption control unit 53 (Step S86 and Step S87). The encryption control unit 53 performs encryption processing on the setting information changed by the user again (Step S88). In this manner, the setting information that has been changed by the user and subjected to the encryption processing again is transmitted to the MFP 9 (Step S89 to Step S93).

The encryption control unit 75 in the MFP 9 performs decryption processing on the setting information received from the portable terminal device 4 (Step S94 to Step S96). The setting unit in the MFP 9 sets each unit based on the setting information subjected to the decryption processing (Step S97 and Step S98).

The information processing system in the fourth embodiment can obtain an effect that encrypted setting information can be transmitted and received between the portable terminal device 4 and the server device 5 and between the portable terminal device 4 and the MFP 9 to improve the safety of the system, as well as the same effects as in each of the above-mentioned embodiments.

Fifth Embodiment

Next, an information processing system in a fifth embodiment is described. The above-mentioned fourth embodiment is an example in which setting information encrypted by the server device 5 is once decrypted on the portable terminal device 4 for the change operation of the user, and after the change operation is completed, the setting information is encrypted again and transmitted to the MFP 9. On the other hand, the fifth embodiment is an example in which setting information received from the server device 5 in an encrypted state is directly transmitted to the MFP 9 in the encrypted state.

Figure 10:
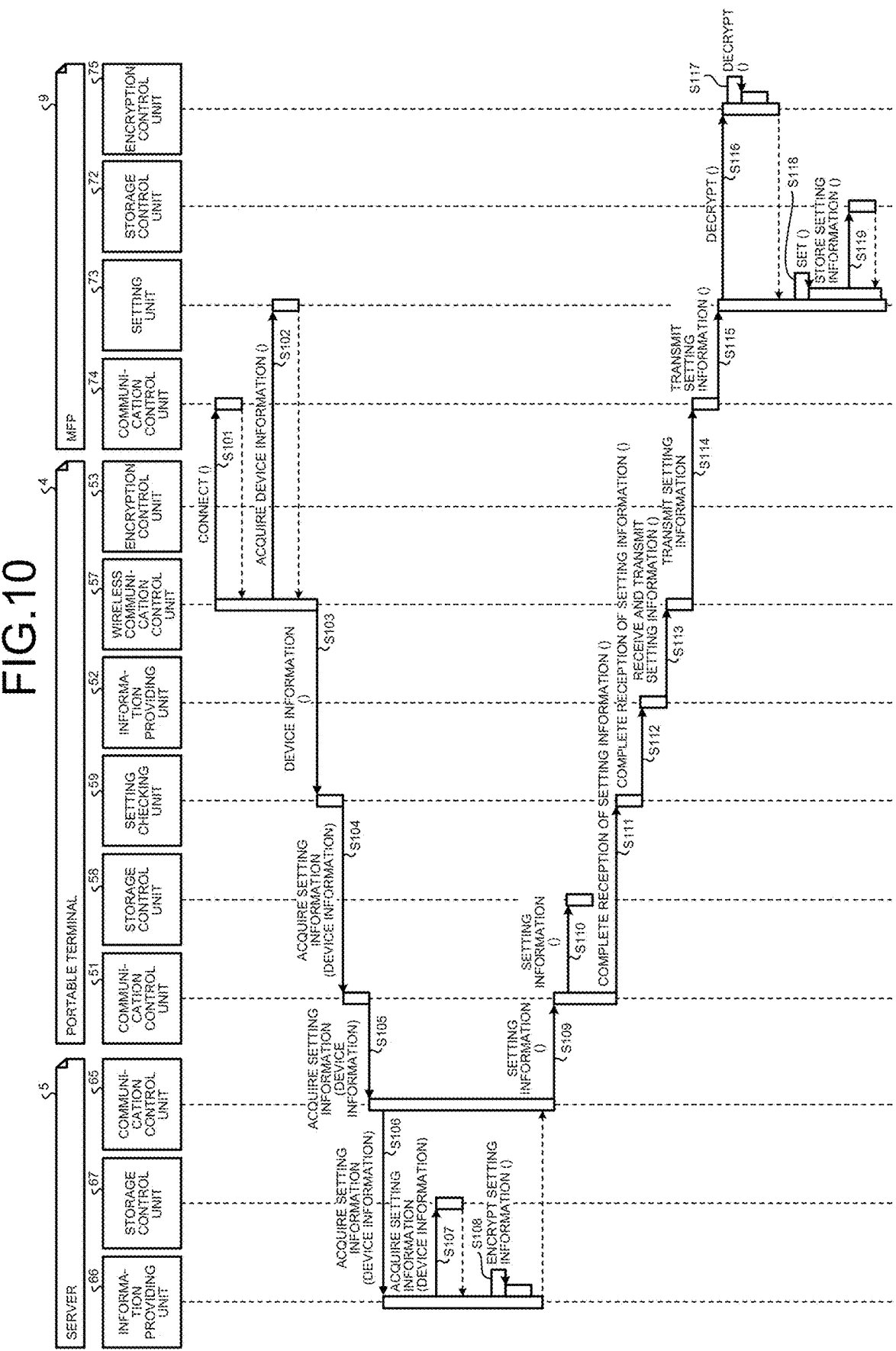
FIG. 10 is a flowchart illustrating the flow of operation of an information processing system in a fifth embodiment.
Figure 11:
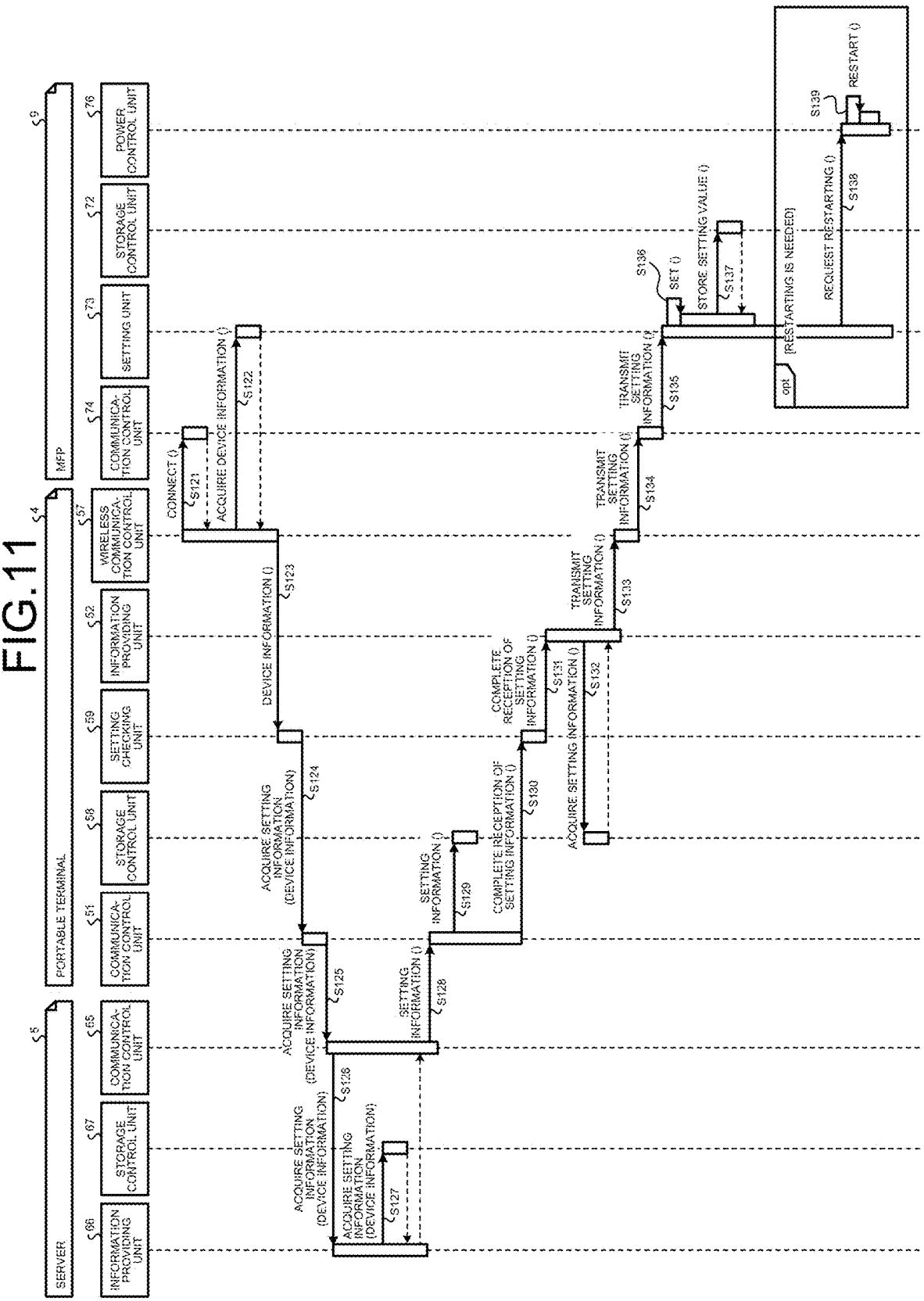
FIG. 11 is a flowchart illustrating the flow of operation of an information processing system in a sixth embodiment.

FIG. 10 is a flowchart illustrating the flow of operation of the information processing system in the fifth embodiment. In the flowchart in FIG. 10, when the server device 5 receives device information on the MFP 9 from the portable terminal device 4 (Step S101 to Step S106), the server device 5 performs encryption processing on setting information for the MFP 9 corresponding to the device information, and transmits the setting information to the portable terminal device 4 (Step S107 to Step S109).

The wireless communication control unit 57 in the portable terminal device 4 transmits the setting information received from the server device 5 to the MFP 9 while maintaining the encrypted state (Step S110 to Step S114). The encryption control unit 75 in the MFP 9 performs decryption processing on the setting information received in the encrypted state (Step S115 to Step S117), and the setting unit 73 performs setting based on the setting information subjected to the decryption processing (Step S118 and Step S119).

The information processing system in the fifth embodiment can also obtain an effect that encrypted setting information can be transmitted and received to improve the safety of the system, as well as the same effects as in each of the above-mentioned embodiments.

Sixth Embodiment

Next, an information processing system in a sixth embodiment is described. The sixth embodiment is an example in which the MFP 9 restarts the system after the setting based on setting information is completed. Specifically, in the sixth embodiment, when the portable terminal device 4 acquires setting information corresponding to device information on the MFP 9 from the server device 5 (Step S121 to Step S128), the portable terminal device 4 transmits the setting information to the MFP 9 (Step S129 to Step S134). The MFP 9 performs setting based on the setting information received from the portable terminal device 4 (Step S135 to Step S137), and determines whether the MFP 9 needs to be restarted in order to reflect the setting. When it is determined that the restarting is needed, the power control unit 76 in the MFP 9 controls the restarting of the MFP 9 (controls restarting of computer system in MFP 9) (Step S138 and Step S139).

Consequently, an effect that setting information that needs the restart can be automatically reflected in the MFP 9 as well as the same effects as in each of the above-mentioned embodiments can be obtained.

Seventh Embodiment

Next, an information processing system in a seventh embodiment is described. The seventh embodiment is an example in which setting information is collectively transmitted to one or a plurality of MFPs 9 selected by a user from a plurality of MFPs 9.

Figure 12:
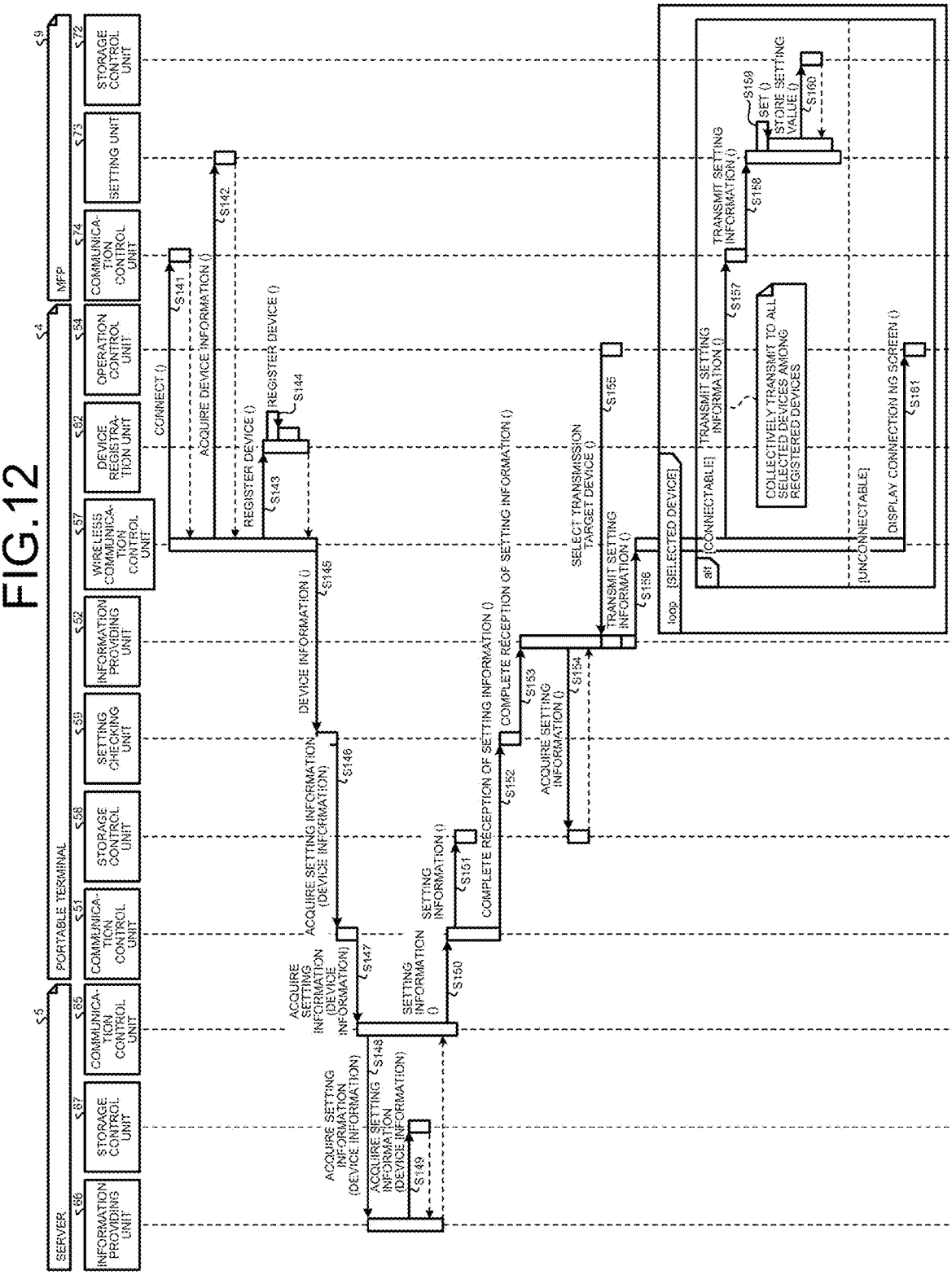
FIG. 12 is a flowchart illustrating the flow of operation of an information processing system in a seventh embodiment.

FIG. 12 is a flowchart illustrating the flow of system operation in the seventh embodiment. In the flowchart in FIG. 12, the device registration unit 62 (example of registration unit) in the portable terminal device 4 acquires in advance device information on a plurality of MFPs 9 for which setting information is set, and stores the device information in the storage unit (Step S141 to Step S144). The wireless communication control unit 57 and the information providing unit 52 in the portable terminal device 4 acquire, from the server device 5, setting information corresponding to the device information on each MFP 9 acquired in advance (Step S145 to Step S154).

Figure 14:
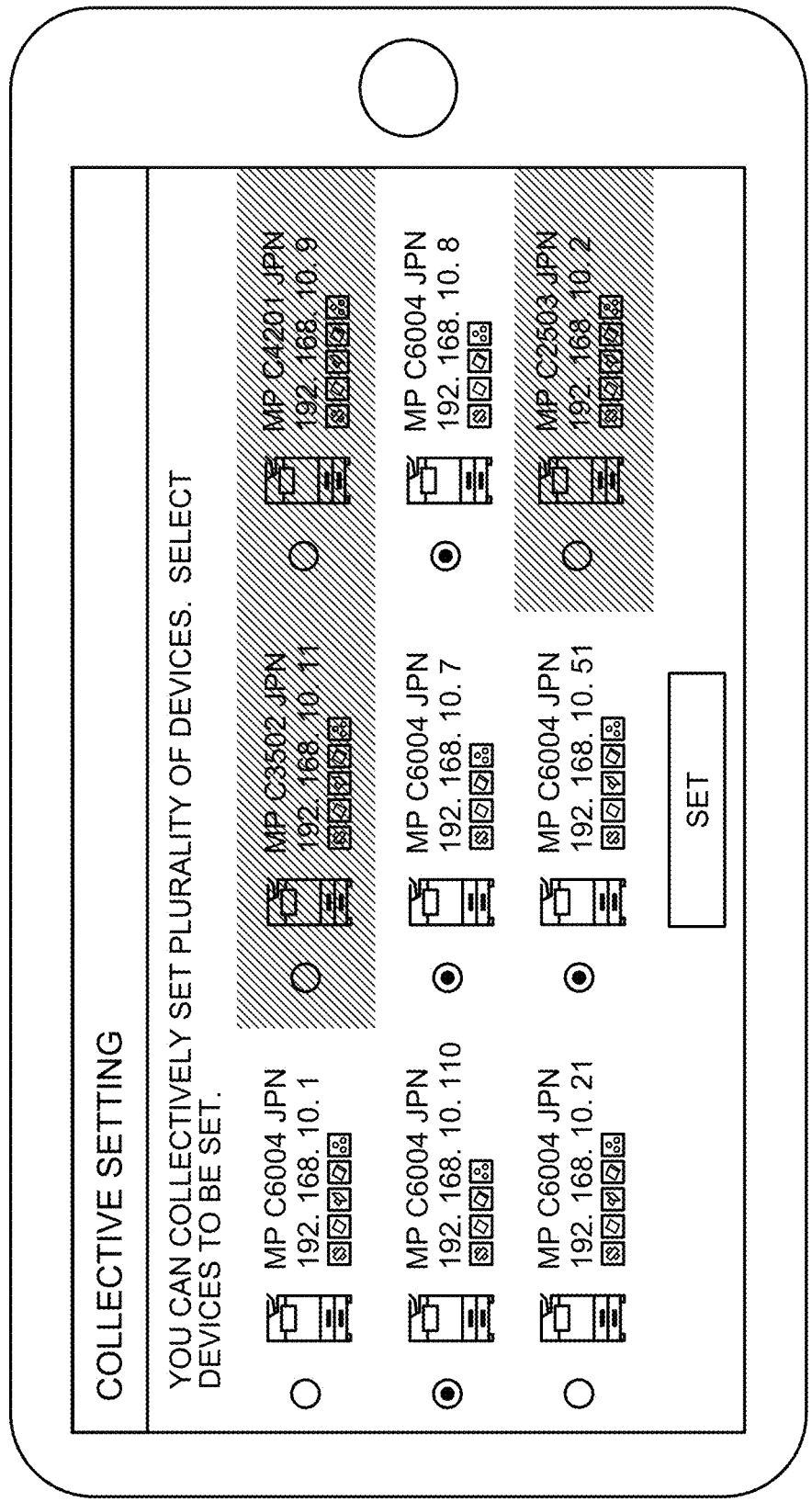
FIG. 14 is a diagram illustrating an example of a collective setting screen on the portable terminal device.

In the case of the seventh embodiment, the user can perform operation to select MFPs 9 to which setting information is collectively transmitted. In this case, the user operates the collective setting button 82 on the setting menu screen illustrated in FIG. 7. When the operation control unit 54 detects the operation of the collective setting button 82, for example, the operation control unit 54 displays a list screen of MFPs 9 registered by the device registration unit 62 at Step S144 as illustrated in FIG. 14 on the display 27. The list screen illustrated in FIG. 14 is a selection screen (collective setting screen) of MFPs 9 to which setting information is transmitted.

In the case where the collective setting screen is displayed, for example, if MFPs 9 located outside a communication range of Wi-Fi (trademark) Direct are displayed on the list screen, the MFPs 9 cannot be communicated and it is difficult to set by the setting information, which is meaningless. If MFPs 9 for which communication is difficult due to weak radio waves by Wi-Fi (trademark) Direct are displayed on the list screen, the setting by the setting information may also be unstable due to the difficulty of communication.

Figure 13:
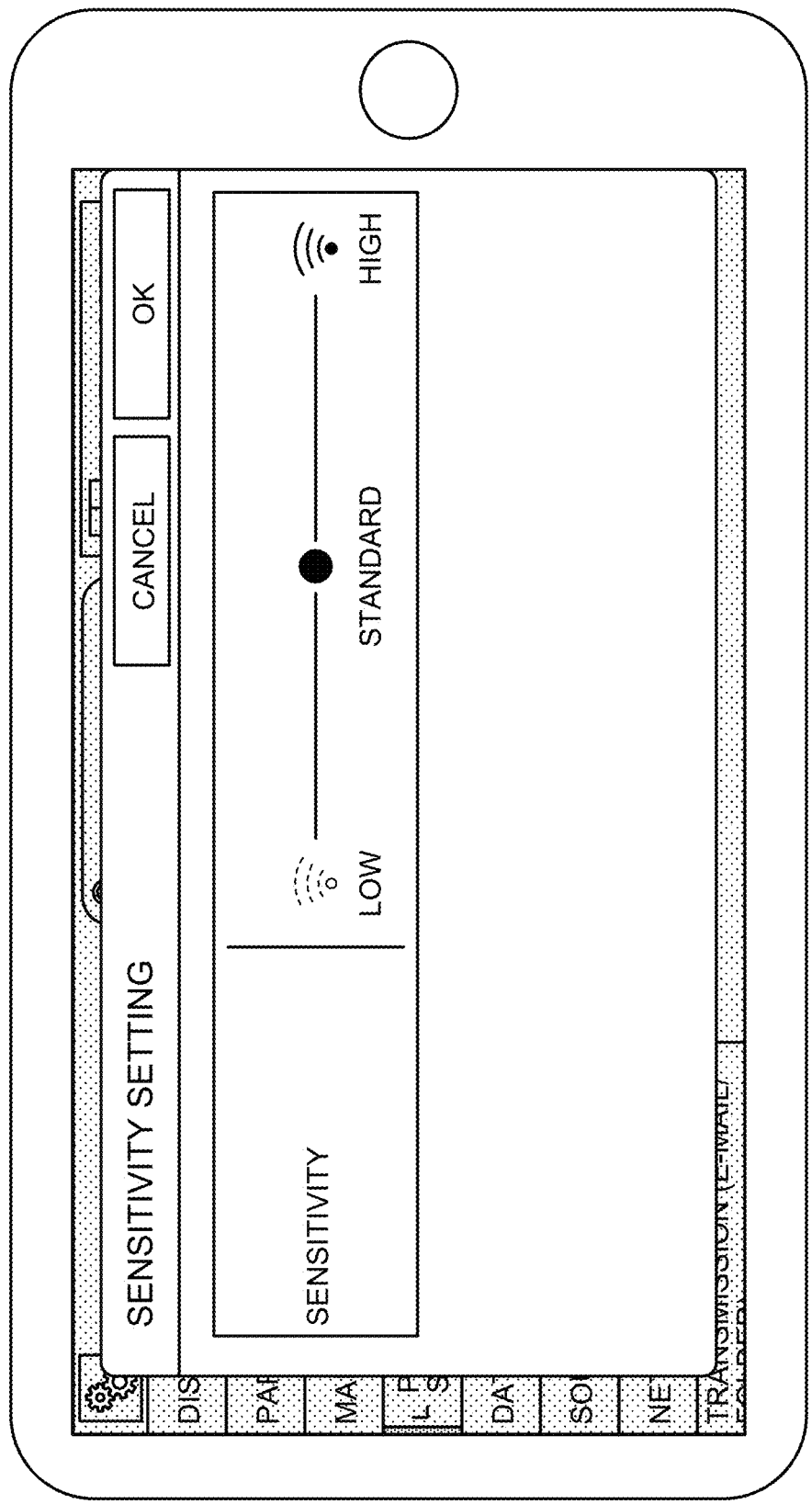
FIG. 13 is a diagram illustrating an example of a sensitivity setting screen on the portable terminal device.

In view of the above, in the case of the seventh embodiment, the user can display a list of MFPs 9 having desired radio field strength or higher and select a desired MFP 9 from the list. Specifically, when MFPs 9 having desired radio field strength or higher are displayed as a list, the user operates the sensitivity setting button 83 illustrated in FIG. 7. When the operation control unit 54 (example of radio field strength designation screen display unit) in the portable terminal device 4 detects the operation of the sensitivity setting button 83 illustrated in FIG. 7, the operation control unit 54 displays a sensitivity setting screen (example of radio field strength designation screen) exemplified in FIG. 13 on the display 27.

In one example, the user slidingly operates a slide bar on the sensitivity setting screen horizontally to designate radio field strength of Wi-Fi (trademark) Direct for MFPs 9 to be displayed as a list. In other words, the slide bar on the sensitivity setting screen is operated to designate a threshold of the radio field strength for determining whether to display MFPs 9 as a list. In the entire operation range of the slide bar, the center position is a position to designate standard radio field strength. When the slide bar is operated to the center position, the operation control unit 54 selects MFPs 9 having radio field strength equal to or higher than the standard radio field strength, and displays the MFPs 9 as a list on the display 27.

In the entire operation range of the slide bar, the right end position is a position to designate high radio field strength. When the slide bar is operated to the right end position, the operation control unit 54 selects MFPs 9 having radio field strength equal to or higher than the high radio field strength, and displays the MFPs 9 as a list on the display 27. In this case, the MFPs 9 having radio field strength equal to or higher than the high radio field strength are selected, and hence it is predicted that, for example, only one or several MFPs 9 are displayed as a list on the display 27.

In the entire operation range of the slide bar, the left end position is a position to designate low radio field strength. When the slide bar is operated to the left end position, the operation control unit 54 selects MFPs 9 having radio field strength equal to or higher than the low radio field strength, and displays the MFPs 9 as a list on the display 27. In this case, the MFPs 9 having radio field strength equal to or higher than the low radio field strength are selected, and hence it is predicted that, for example, many MFPs 9 are displayed as a list on the display 27.

In this manner, the user operates the slide bar on the sensitivity setting screen to adjust the number of MFPs 9 displayed as a list. The collective setting screen illustrated in FIG. 14 is a screen on which MFPs 9 having radio field strength designated by the user based on the sensitivity setting screen are selectively displayed as a list by the operation control unit 54.

The example in FIG. 14 is an example in which model numbers of the MFP 9 such as "MP C6004 JPN" and "MP C4201 JPN", network addresses such as "192.168.10.1" and "192.168.10.9", and check circles for instructing whether to transmit setting information are displayed.

The user selects MFPs 9 to which setting information is transmitted from among the MFPs 9 displayed as a list, and checks the check circles. The example in FIG. 14 is an example in which the check circles of four MFPs 9 among six MFPs 9 of the model "MP C6004 JPN" are checked. The operation control unit 54 notifies the information providing unit 52 of the MFPs 9 selected by the user (devices to which setting information is to be transmitted) (Step S155). The information providing unit 52 transmits setting information to be transmitted to the MFPs 9 selected by the user to the wireless communication control unit 57 (Step S156).

Next, the wireless communication control unit 57 determines whether a communication line of a predetermined communication scheme such as Wi-Fi (trademark) Direct can be established for the MFPs 9 selected by the user (MFPs 9 whose check circles are checked). This determination is performed by the wireless communication control unit 57 by attempting to establish the communication line of Wi-Fi (trademark) Direct for each of the selected MFPs 9.

When it is determined that all the MFPs 9 selected by the user can be communicated by Wi-Fi (trademark) Direct, the wireless communication control unit 57 sequentially pairs with the MFPs 9, and sequentially transmits the setting information to the MFPs 9 by Wi-Fi (trademark) Direct (Step S157 and Step S158). The setting unit 73 in the MFP 9 that has received the setting information sets each unit based on the received setting information (Step S159 and Step S160).

On the other hand, when it is determined that one or a plurality of MFPs 9 among all the MFPs 9 selected by the user cannot be communicated by Wi-Fi (trademark) Direct, the operation control unit 54 (example of transmission error display control unit) displays and controls a connection NG screen specifying the uncommunicable MFPs 9 on the display 27 (Step S161). The user looking at the connection NG screen excludes the uncommunicable MFPs 9 based on the selection screen (collective setting screen) of the MFPs 9 to which the setting information is to be transmitted as illustrated in FIG. 14, and designates collective transmission again.

The seventh embodiment can obtain an effect that the setting of desired MFPs 9 can be collectively completed simply by designating the desired MFPs 9 based on the collective setting screen, as well as the same effects as in each of the above-mentioned embodiments.

Eighth Embodiment

Next, an information processing system in an eighth embodiment is described. The above-mentioned seventh embodiment is an example in which when an MFP 9 that cannot be communicated is present among MFPs 9 collectively transmitted by a user, a connection NG screen is displayed to prompt the user to select MFPs 9 to be collectively transmitted again. On the other hand, the eighth embodiment is an example in which only communicable MFPs 9 can be collectively transmitted so as to omit the operation to display the connection NG screen.

Figure 15:
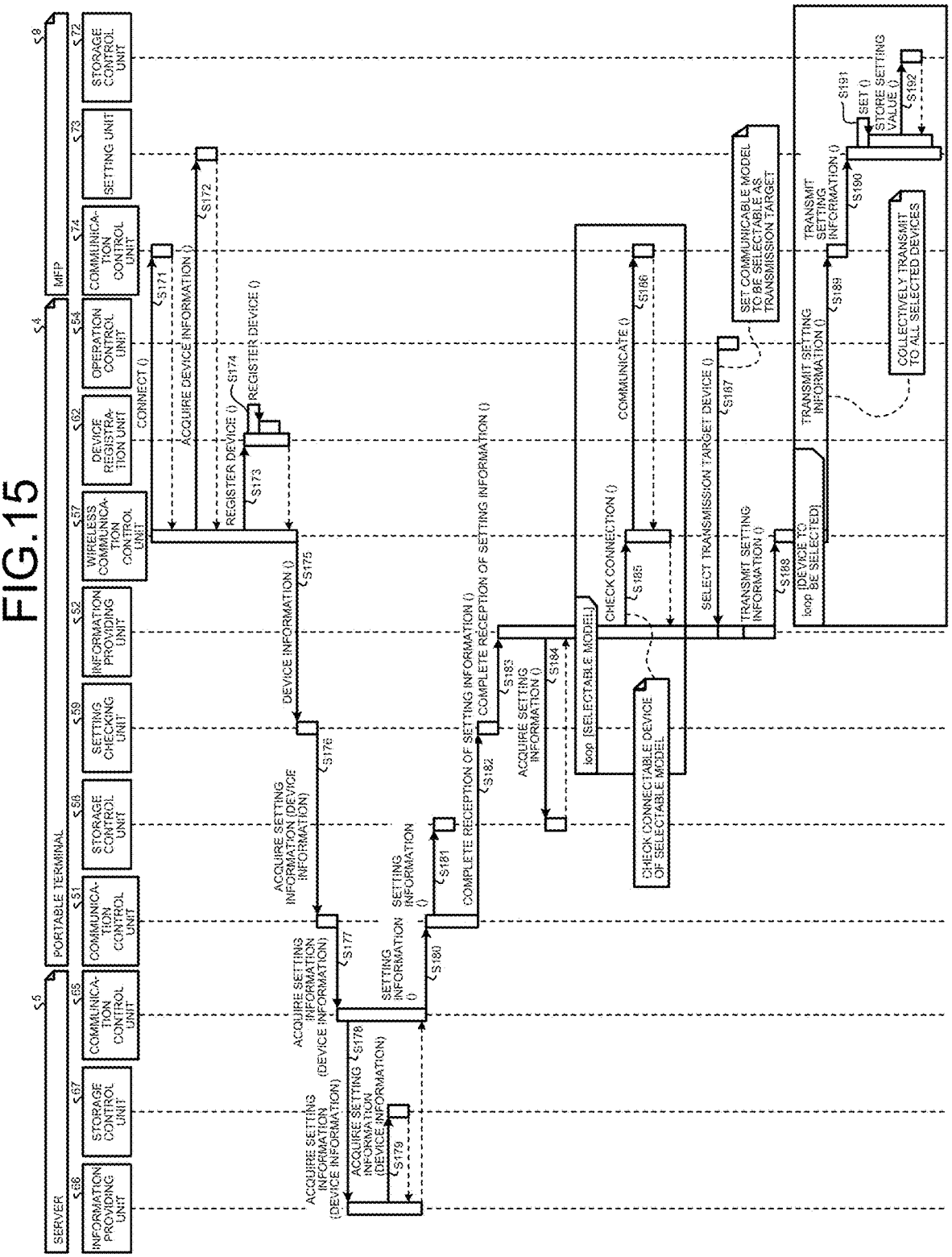
FIG. 15 is a flowchart illustrating the flow of operation of an information processing system in an eighth embodiment.

FIG. 15 is a flowchart illustrating the flow of system operation in the eighth embodiment. In the case of the eighth embodiment, the flow until MFPs 9 are registered in advance (Step S171 to Step S174) and setting information corresponding to device information on the MFP 9 is acquired from the server device 5 (Step S175 to Step S184) is the same as in the seventh embodiment.

The wireless communication control unit 57 in the portable terminal device 4 performs pairing processing on each of the MFPs 9 registered in advance, and performs connection checking processing for checking whether communication by, for example, Wi-Fi (trademark) Direct is possible (Step S185 and Step S186). The operation control unit 54 forms a collective setting screen (see FIG. 14) of MFPs 9 that are determined to be connectable by the connection checking processing among the MFPs 9 registered in advance, and displays the collective setting screen on the display 27.

In the case of the eighth embodiment, a user selects desired MFPs 9 for which setting information is set from among the communicable MFPs 9 displayed in a list on the collective setting screen. The wireless communication control unit 57 sequentially performs pairing with the MFPs 9 selected by the user, and transmits the setting information by, for example, Wi-Fi (trademark) Direct (Step S187 to Step S189). Each MFP 9 performs setting based on the received setting information (Step S190 to Step S192).

Ninth Embodiment

Next, an information processing system in a ninth embodiment is described. The ninth embodiment is an example in which administrator authentication of a user who sets setting information to the MFP 9 is performed to improve the security of the system.

Figure 16:
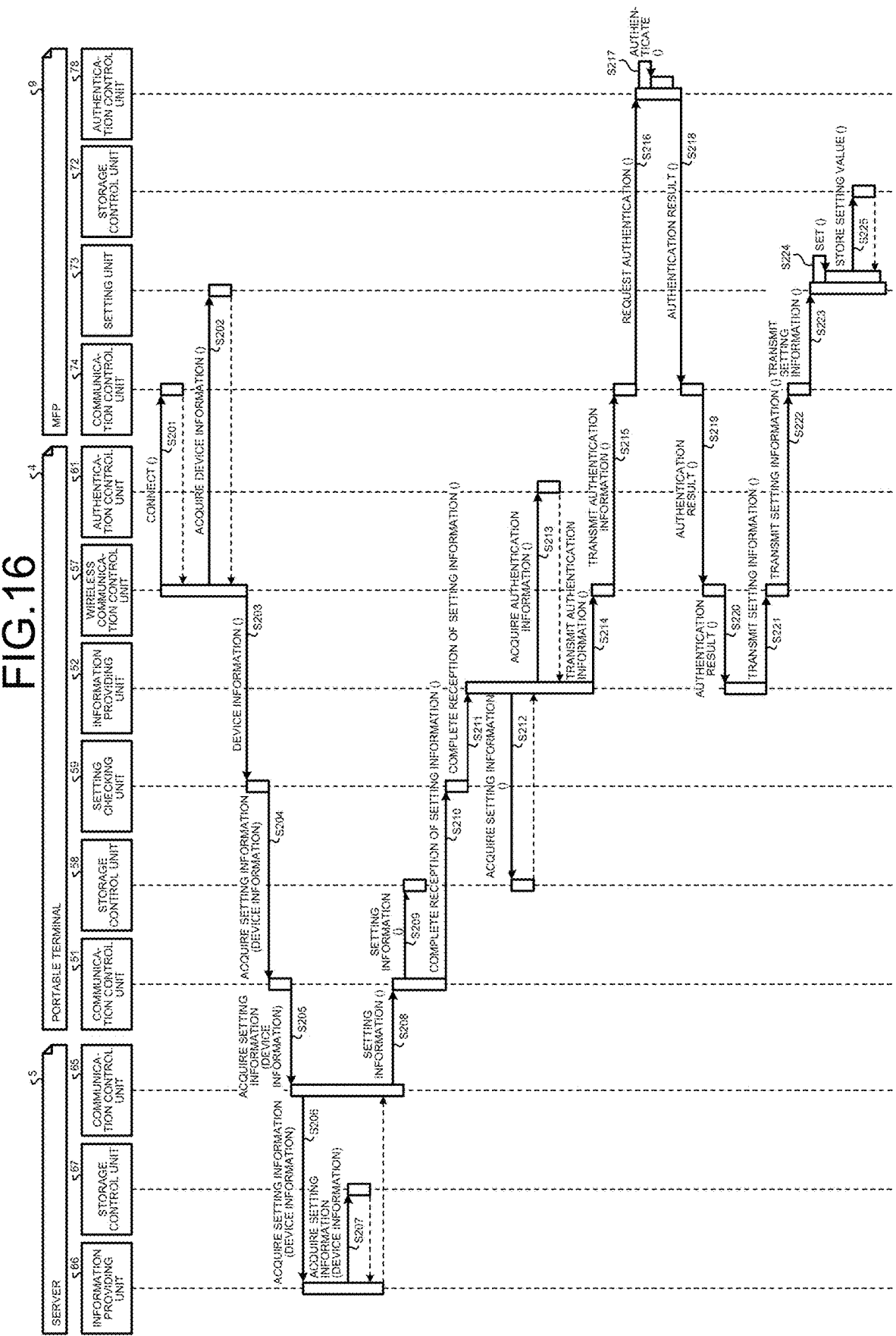
FIG. 16 is a flowchart illustrating the flow of operation of an information processing system in a ninth embodiment.

FIG. 16 is a flowchart illustrating the flow of system operation of the information processing system in the ninth embodiment. Also in the case of the information processing system in the ninth embodiment, the portable terminal device 4 acquires setting information corresponding to device information on the MFP 9 from the server device 5 similarly to the above (Step S201 to Step S212).

Figure 17:
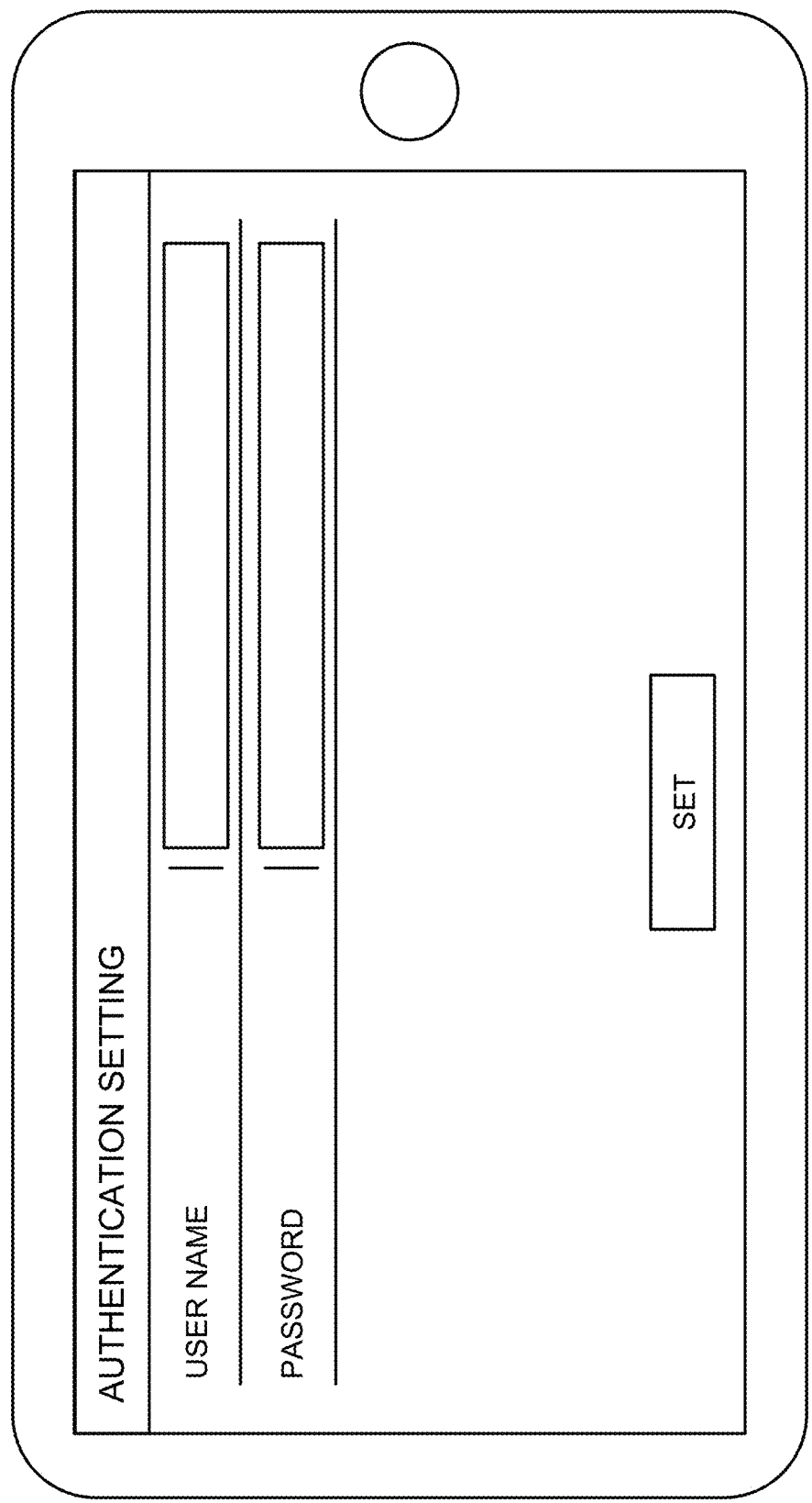
FIG. 17 is a diagram illustrating an example of an authentication setting screen.

When the information providing unit 52 in the portable terminal device 4 receives setting information from the server device 5, the information providing unit 52 requests the authentication control unit 61 (example of authentication request unit) to acquire authentication information (Step S213). When the authentication control unit 61 receives the request to acquire the authentication information, for example, the authentication control unit 61 displays an authentication setting screen illustrated in FIG. 17 on the display 27. A user who wants to set the MFP 9 inputs authentication information such as a user name and a password to the authentication setting screen. The wireless communication control unit 57 transmits the input authentication information to the MFP 9 (Step S214 and Step S215).

The authentication control unit 78 in the MFP 9 collates authentication information on each user stored in a storage unit in advance with the authentication information received from the portable terminal device 4, and determines whether the user who now wants to set the MFP 9 is a user having legitimate authority. The authentication control unit 78 returns the authentication result to the portable terminal device through the communication unit 74 (Step S216 to Step S218).

When the information providing unit 52 in the portable terminal device 4 obtains the authentication result indicating that the user who now wants to set the MFP 9 is a user having legitimate authority from the authentication control unit 78 in the MFP 9, the information providing unit 52 transmits setting information on the MFP 9 to the MFP 9 through the wireless communication control unit 57 (Step S219 to Step S222). In this manner, the setting unit in the MFP 9 performs setting based on the setting information (Step S223 to Step S225).

Note that, when the user is not authenticated as a user having legitimate authority, the authentication control unit 78 in the portable terminal device 4 displays authentication error warning on the display 27. In this case, the setting processing of the MFP 9 is not performed.

The information processing system in the ninth embodiment can obtain an effect that only a user having legitimate authority can set the MFP 9 and hence the security of the system can be improved, as well as the same effects as in each of the above-mentioned embodiments.

Tenth Embodiment

Figure 18:
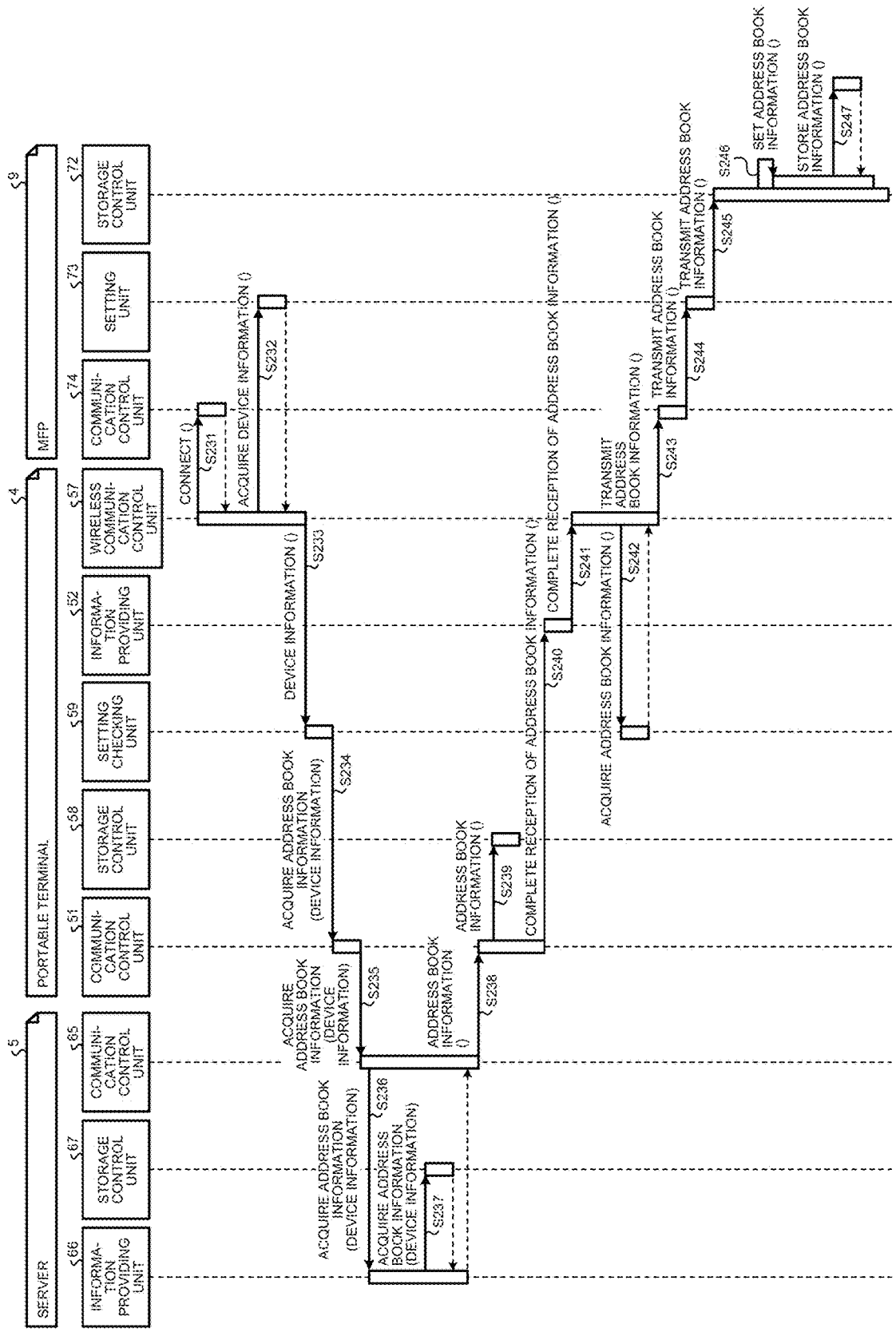
FIG. 18 is a flowchart illustrating the flow of operation of an information processing system in a tenth embodiment.

Next, an information processing system in a tenth embodiment is described. The tenth embodiment is an example in which address information is set to the MFP 9. FIG. 18 is a flowchart illustrating the flow of system operation of the information processing system in the tenth embodiment. In the flowchart in FIG. 18, the setting checking unit 59 in the portable terminal device 4 acquires device information from the MFP 9 (Step S231 to Step S233), transmits the device information to the server device 5 through the communication control unit 51, and requests the server device 5 to acquire address book information (Step S234 and Step S235).

The information providing unit 66 in the server device 5 transmits address book information corresponding to the device information on the MFP 9 to the portable terminal device 4 through the communication unit 65 (Step S236 to Step S238). The storage control unit 58 in the portable terminal device 4 stores and controls the address book information received from the server device 5 in the storage unit (Step S239). The communication control unit 51 notifies the information providing unit 52 of the completion of the reception of the address book information (Step S240 and Step S241).

Next, the information providing unit 52 acquires the address book information stored in the storage unit, and transmits the address book information to the MFP 9 through the wireless communication control unit 57 (Step S242 to Step S244). In this manner, the setting unit 73 in the MFP 9 sets the address book information received from the portable terminal device 4 to the MFP 9, and stores the address book information in the storage unit (Step S245 to Step S247).

The information processing system in the tenth embodiment can obtain an effect that an address book corresponding to device information can be set to the MFP 9 from the portable terminal device 4, as well as the same effects as in each of the above-mentioned embodiments.

Eleventh Embodiment

Figure 19:
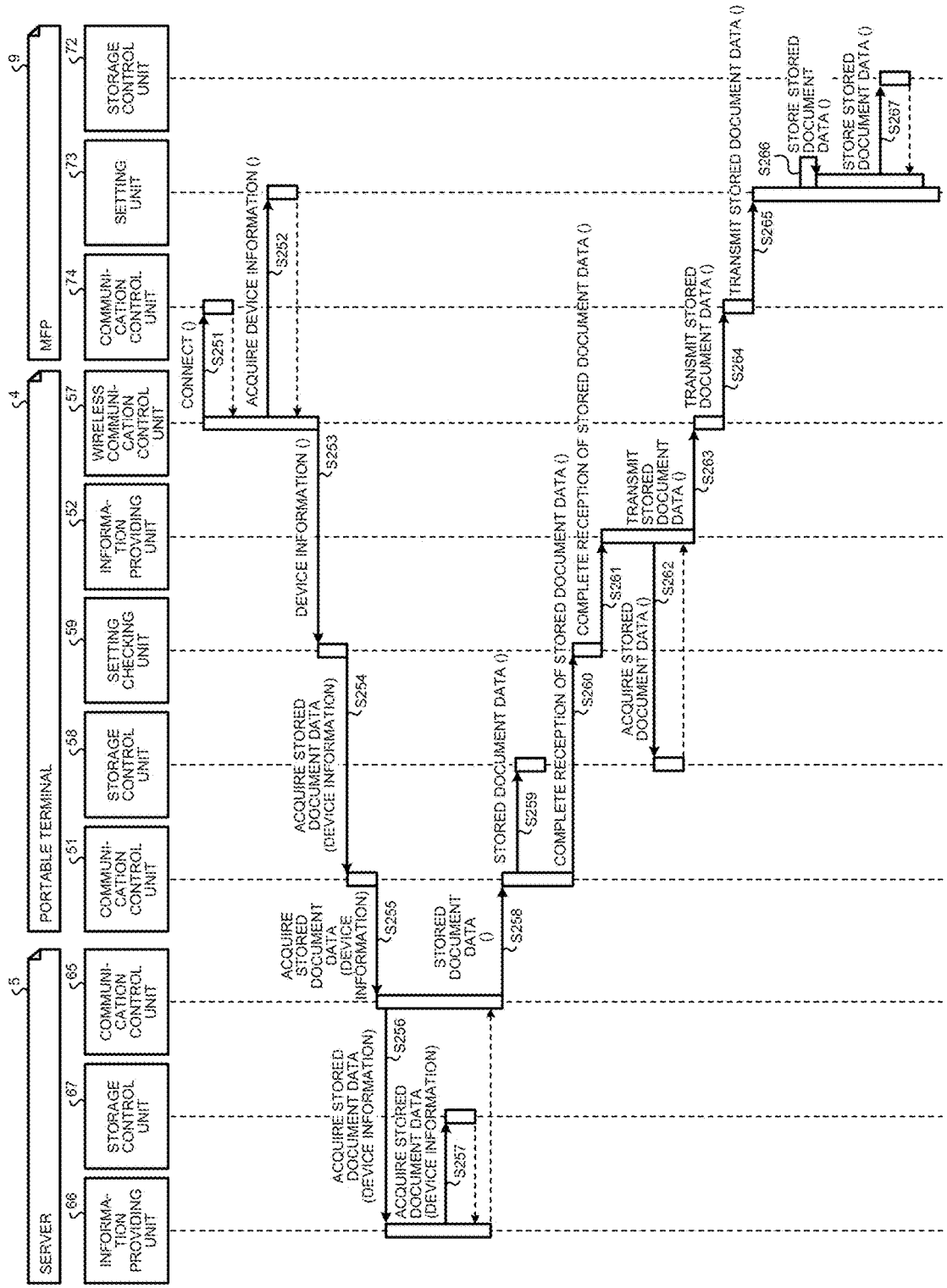
FIG. 19 is a flowchart illustrating the flow of operation of an information processing system in an eleventh embodiment.

Next, an information processing system in an eleventh embodiment is described. The eleventh embodiment is an example in which the portable terminal device 4 acquires stored document data as printing data from the server device 5 and transmits the stored document data to the MFP 9. FIG. 19 is a flowchart illustrating the flow of system operation of the information processing system in the eleventh embodiment. In the flowchart in FIG. 19, the setting checking unit 59 in the portable terminal device 4 acquires device information from the MFP 9 (Step S251 to Step S253), transmits the device information to the server device 5 through the communication control unit 51, and requests the server device 5 to acquire stored document data (Step S254 and Step S255).

The information providing unit 66 in the server device 5 transmits stored document data corresponding to the device information in the MFP 9 to the portable terminal device 4 through the communication unit 65 (Step S256 to Step S258). The storage control unit 58 in the portable terminal device 4 stores and controls the stored document data received from the server device 5 in the storage unit (Step S259). The communication control unit 51 notifies the information providing unit 52 of the completion of the reception of the stored document data (Step S260 and Step S261).

Next, the information providing unit 52 acquires the stored document data stored in the storage unit, and transmits the stored document data to the MFP 9 through the wireless communication control unit 57 (Step S262 to Step S264). In this manner, the setting unit 73 in the MFP 9 stores the stored document data received from the portable terminal device 4 in the storage unit, and uses the stored document data for printing at predetermined timing (Step S265 to Step S267).

The information processing system in the eleventh embodiment can obtain an effect that stored document data corresponding to device information can be supplied to the MFP 9 through the portable terminal device 4 for printing, as well as the same effects as in each of the above-mentioned embodiments.

Twelfth Embodiment

Figure 20:
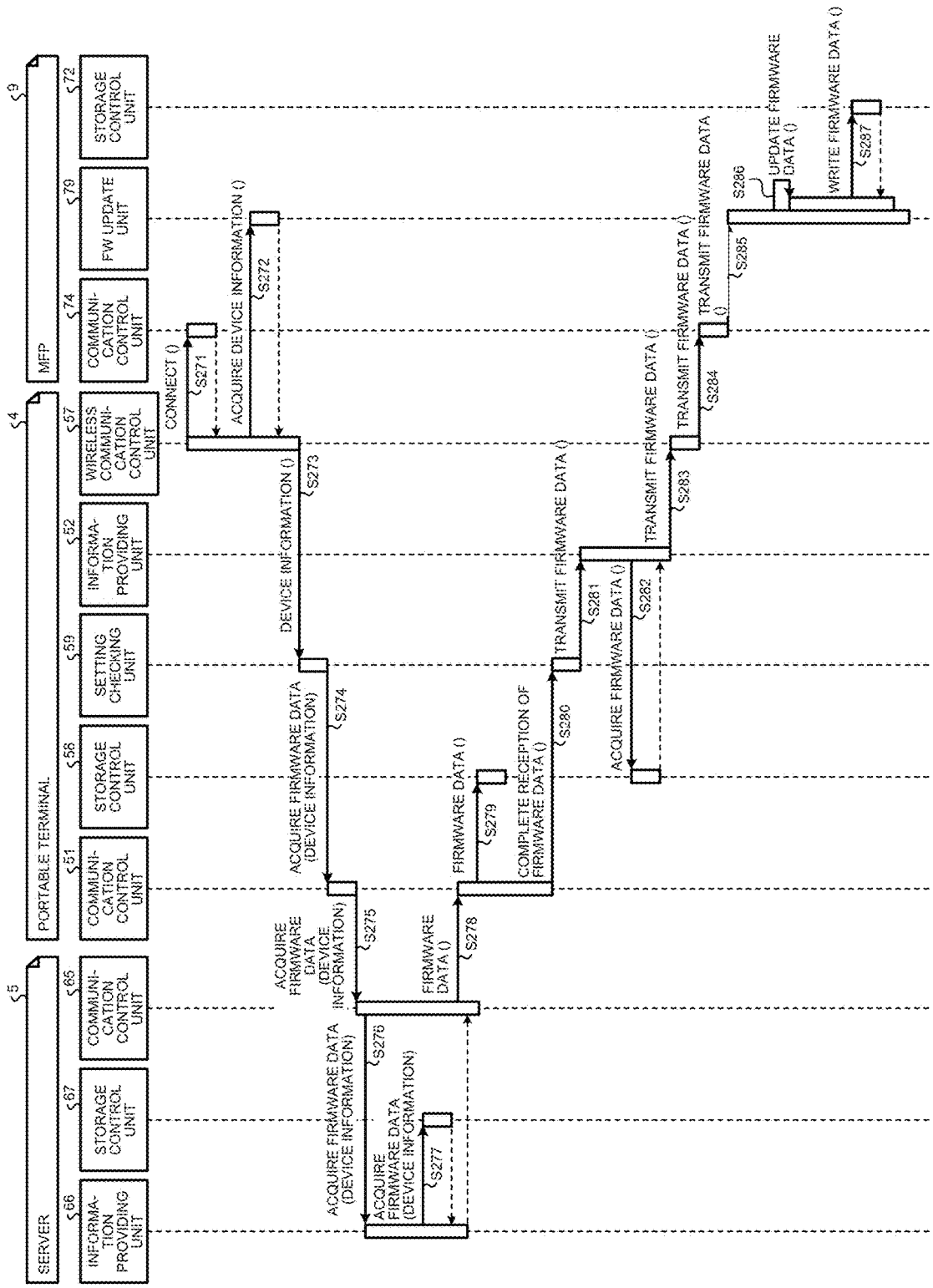
FIG. 20 is a flowchart illustrating the flow of operation of an information processing system in a twelfth embodiment.

Next, an information processing system in a twelfth embodiment is described. The twelfth embodiment is an example in which the portable terminal device 4 updates firmware of the MFP 9 with firmware acquired from the server device 5. FIG. 20 is a flowchart illustrating the flow of system operation of the information processing system in the twelfth embodiment. In the flowchart in FIG. 20, the setting checking unit 59 in the portable terminal device 4 acquires device information from the MFP 9 (Step S271 to Step S273), transmits the device information to the server device 5 through the communication control unit 51, and requests the server device 5 to acquire firmware data (Step S274 and Step S275).

The information providing unit 66 in the server device 5 transmits firmware data corresponding to the device information on the MFP 9 to the portable terminal device 4 through the communication unit 65 (Step S276 to Step S278). The storage control unit 58 in the portable terminal device 4 stores and controls the firmware data received from the server device 5 in the storage unit (Step S279). The communication control unit 51 notifies the information providing unit 52 of the completion of the reception of the firmware data (Step S280 and Step S281).

Next, the information providing unit 52 acquires the firmware data stored in the storage unit, and transmits the firmware data to the MFP 9 through the wireless communication control unit 57 (Step S282 to Step S284). In this manner, the FW update unit 79 in the MFP 9 updates firmware data on the MFP 9 with the firmware data received from the portable terminal device 4 (Step S285 and Step S286). The storage control unit 72 stores the firmware data used for the updating in the storage unit (Step S287).

The information processing system in the twelfth embodiment can obtain an effect that the portable terminal device 4 can acquire firmware data corresponding to device information from the server device 5 and update firmware data on the MFP 9, as well as the same effects as in each of the above-mentioned embodiments.

Thirteenth Embodiment

Figure 21:
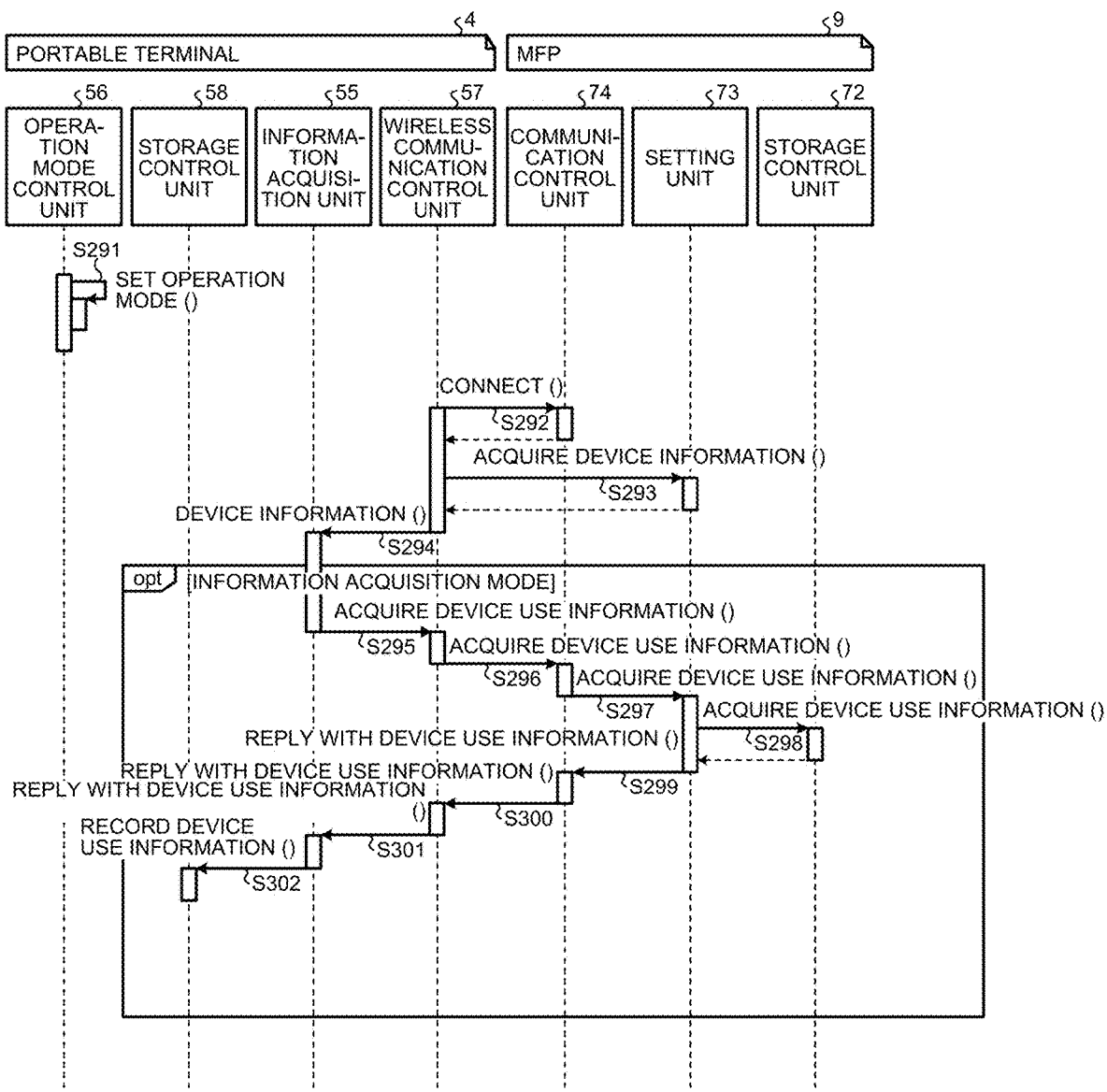
FIG. 21 is a flowchart illustrating the flow of operation of an information processing system in a thirteenth embodiment.

Next, an information processing system in a thirteenth embodiment is described. The thirteenth embodiment is an example in which the portable terminal device 4 acquires device use information such as a toner remaining amount or an error history from the MFP 9. FIG. 21 is a flowchart illustrating the flow of operation of the information processing system in the thirteenth embodiment. In the thirteenth embodiment, a user operates the input device 26 to designate shift to an information acquisition mode, which is a mode for acquiring device use information from the MFP 9. When the shift of the mode is designated, in the flowchart in FIG. 21, the operation mode control unit 56 shifts an operation mode of the portable terminal device 4 to the information acquisition mode for acquiring device use information from the MFP 9 (Step S291).

When the operation mode is shifted to the information acquisition mode, the wireless communication control unit 57 acquires device information from the MFP 9 (Step S292 to Step S294). The information acquisition unit 55 requests the MFP 9 to acquire device use information through the wireless communication control unit 57 (Step S295 and Step S296). When receiving the request to acquire device use information, the setting unit 73 in the MFP 9 acquires device use information stored in the storage unit in the MFP 9 through the storage control unit 72, and transmits the device use information to the portable terminal device 4 (Step S297 to Step S300).

The information acquisition unit 55 in the portable terminal device 4 stores the device use information acquired from the MFP 9 in the storage unit through the storage control unit 58 (Step S301 and Step S302). For example, the device use information stored in the storage unit is displayed on the display 27 by the operation control unit 54 and referenced by a user.

The information processing system in the thirteenth embodiment can obtain an effect that the portable terminal device 4 can acquire device use information from the MFP 9 through the wireless communication line without using the external network 11, as well as the same effects as in each of the above-mentioned embodiments.

Fourteenth Embodiment

Next, an information processing system in a fourteenth embodiment is described. The fourteenth embodiment is an example in which device use information on MFPs 9 that are not centrally controlled by the server device 5 (decentrally controlled devices) among all MFPs 9 is transmitted to the server device 5 through the portable terminal device 4 so that the server device 5 can centrally control the decentrally controlled devices.

Figure 22:
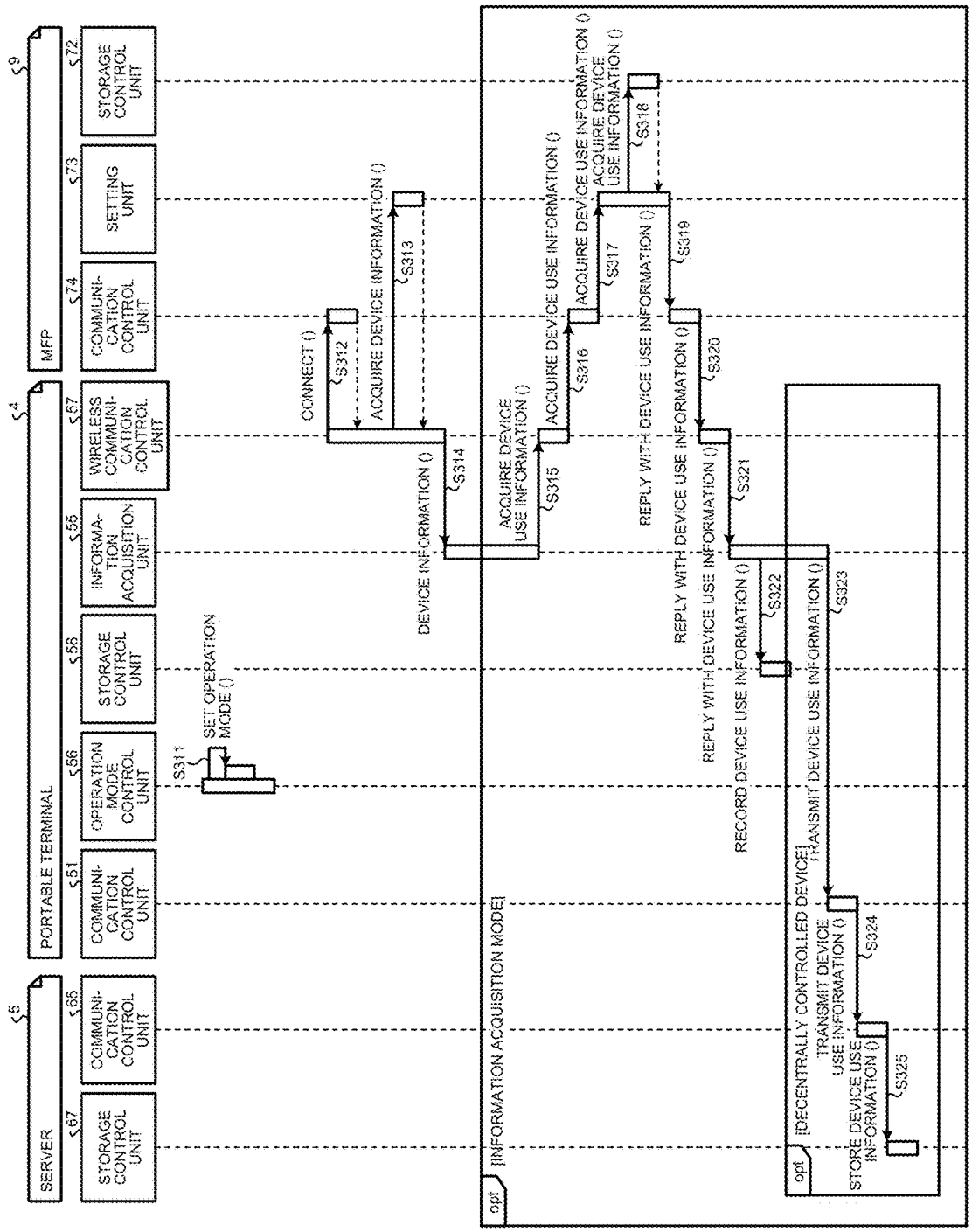
FIG. 22 is a flowchart illustrating the flow of operation of an information processing system in a fourteenth embodiment.

FIG. 22 is a flowchart illustrating the flow of operation of the information processing system in the fourteenth embodiment. In the flowchart in FIG. 22, the operation mode control unit 56 shifts, in response to operation from a user, an operation mode of the portable terminal device 4 to an information acquisition mode for acquiring device use information from the MFP 9 (Step S311).

When the operation mode shifts to the information acquisition mode, the information acquisition unit 55 acquires device information and device use information from the MFPs 9 that are decentrally controlled devices (Step S312 to Step S322), and transmits the device information and device use information to the server device 5 (Step S323 and Step S324). The storage control unit 67 in the server device 5 stores and manages the device use information on the MFPs 9 that are decentrally controlled devices received from the portable terminal device 4 in the storage unit (Step S325).

The information processing system in the fourteenth embodiment can obtain an effect that the portable terminal device 4 can acquire device use information on MFPs 9 that are decentrally controlled devices and transmit the device use information to the server device 5 so that the server device 5 can centrally control the decentrally controlled devices, as well as the same effects as in each of the above-mentioned embodiments.

Fifteenth Embodiment

Next, an information processing system in a fifteenth embodiment is described. The fifteenth embodiment is an example in which setting information acquired from the MFP 9 can be changed on the portable terminal device 4 side and set to the MFP 9.

Note that, in the description in the fifteenth embodiment, setting information on the MFP 9 is changed by the portable terminal device 4. In addition thereto, for example, setting information for updating may be stored in a recording medium such as a universal serial bus (USB) memory or a disk recording medium, and the MFP 9 may read the setting information from the storage medium such as a USB memory and update the setting information.

Figure 23:
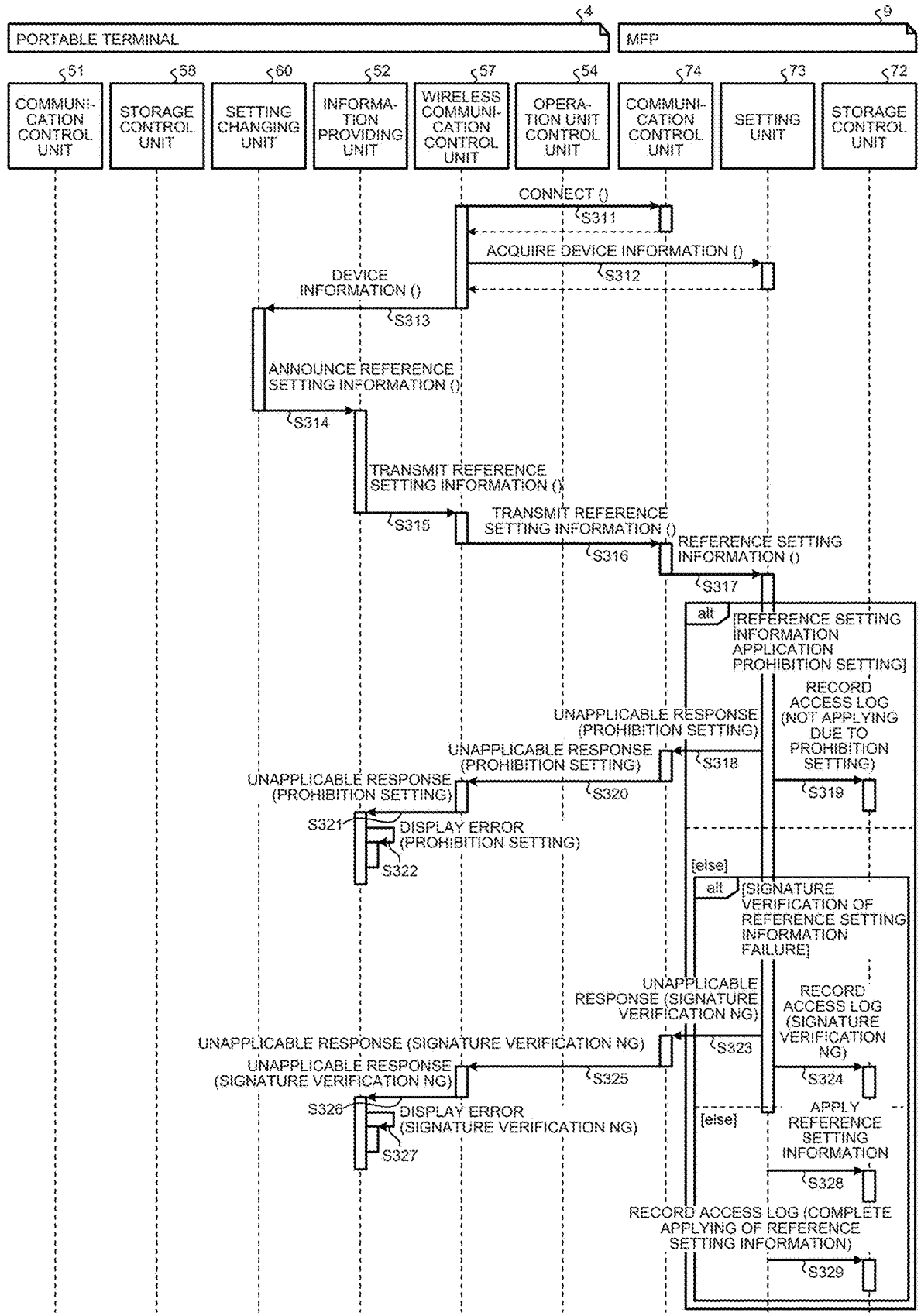
FIG. 23 is a flowchart illustrating the flow of operation of an information processing system in a fifteenth embodiment.

FIG. 23 is a sequence diagram illustrating the flow for changing setting information on the MFP 9 of each model by the portable terminal device 4. In this case, when the wireless communication control unit 57 in the portable terminal device 4 connects a wireless communication line such as Wi-Fi (trademark) Direct to the MFP 9 (Step S311), the wireless communication control unit 57 acquires current setting information together with unique device information for each model from the MFP 9 (Step S312 and Step S313).

Next, the setting changing unit 60 in the portable terminal device 4 generates reference setting information for changing the setting information on the MFP 9 in response to change operation from a user, and transmits the reference setting information to the MFP 9 through the information providing unit 60 and the wireless communication control unit 57 (Step S314 to Step S317).

The setting information on the MFP 9 can be updated with the reference setting information received from the portable terminal device 4. However, the setting information can be updated with the reference setting information received from the portable terminal device 4 only when the updating of the setting information on the MFP 9 side is allowed. Thus, when the setting unit 73 in the MFP 9 receives the reference setting information (Step S317), the setting unit 73 detects enable/disable of "reference setting information application prohibited setting", which is setting to prohibit the change of the setting information by the reference setting information. The "reference setting information application prohibited setting" is set by an administrator of the MFP 9.

When the reference setting information application prohibited setting is "enabled", the setting unit 73 transmits an "unapplicable response" indicating that the change of the setting information on the MFP 9 is prohibited to the portable terminal device 4 through the communication control unit 74 (Step S318, and Step S320 to Step S321).

Note that, when the unapplicable response is made, the storage control unit 72 in the MFP 9 records an access log indicating that the setting information is not changed by the reference setting information from the user because the reference setting information application prohibited setting is "enabled" in the recording unit such as the HDD 47 (Step S319).

When the information providing unit 32 in the portable terminal device 4 receives an unapplicable response, the information providing unit 32 displays an error indicating that the setting information on the MFP 9 is unchangeable (reference setting information application prohibited setting) on the display 27 (Step S322). In this manner, the user of the portable terminal device 4 can recognize that the setting change of the MFP 9 is denied due to the reference setting information application prohibited setting.

On the other hand, when the reference setting information application prohibited setting of the MFP 9 is "disabled" (when setting information is changeable), the setting unit 73 in the MFP 9 verifies the validity of a user who changes the setting information on the MFP 9 based on signature data of the received reference setting information. As a result of the validity verification, when the user who changes the setting information on the MFP 9 is not validated (signature verification failure), the setting unit 73 in the MFP 9 transmits an unapplicable response indicating that the setting information on the MFP 9 cannot be changed by the reference setting information to the portable terminal device 4 (Step S323, Step S325, and Step S326).

When the information providing unit 52 in the portable terminal device 4 receives the unapplicable response, because the signature verification is NG, the information providing unit 52 displays an error indicating that the setting information on the MFP 9 cannot be changed on the display 27 (Step S327). In this manner, the user of the portable terminal device 4 can recognize that the setting change of the MFP 9 is denied because the signature verification is NG.

Note that, when the unapplicable response is made, the storage control unit 72 in the MFP 9 records an access log indicating that the setting information is not changed by the reference setting information from the user because the signature verification is NG in the recording unit such as the HDD 47 (Step S324).

On the other hand, when the user who changes the setting information on the MFP 9 is validated, the setting unit 73 in the MFP 9 changes various attributes such as the allowable value of the setting value and the authority capable of changing the setting value in addition to the settable items based on the reference setting information received from the portable terminal device 4 of the user (Step S328).

After the processing for changing the setting information is completed, the storage control unit 72 in the MFP 9 records an access log indicating that the processing for changing the setting information on the MFP 9 by the reference setting information from the user is completed in a recording unit such as the HDD 47 (Step S329). Consequently, an effect that the setting information on the MFP 9 can be changed by the portable terminal device 4 as well as the same effects as in each of the above-mentioned embodiments can be obtained.

Each function in the above-mentioned embodiments can be implemented by one or a plurality of processing circuits. The "processing circuit" includes a processor programmed to execute each function by software, such as a processor implemented by an electronic circuit, or a device such as an application specific integrated circuit (ASIC), a digital signal processor (DSP), a field programmable gate array (FPGA), or a conventional circuit module designed to execute each of the above-mentioned functions.

An embodiment provides an advantageous effect that information can be acquired and provided to an image forming device even under environments where connection to an external network connected to a server device that distributes the information is difficult.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A non-transitory computer-readable medium including programmed instructions that cause a computer to:
   control wireless communication so as to connect to an image forming device by wireless communication;
   acquire unique device information from the image forming device through the wireless communication control;
   acquire, from a server, predetermined information to be supplied to the image forming device; and
   provide the information acquired from the server to the image forming device through the wireless communication control, wherein the programmed instructions further cause the computer to change predetermined information acquired from the server in response to a change operation, and provide changed information to the image forming device through the wireless communication control, and wherein the programmed instructions further cause the computer to determine whether the information is chargeable based on predetermined reference setting information, and provide information determined to be changeable, to the image forming device through the wireless communication control.

2. The non-transitory computer-readable medium according to claim 1, wherein the programmed instructions further cause the computer to provide the information acquired from the server to the image forming device through the wireless communication control, when a volume of the information acquired from the server equal to or less than a predetermined threshold or equal to or less than a wireless communication capacity of the wireless communication.

3. The non-transitory computer-readable medium according to claim 1, wherein the image forming device includes a plurality of image forming devices, the programed instructions further cause the computer to acquire the information for the plurality of image forming devices from the server in advance, and provide information for an image forming device specified by an unique device information among the information for the plurality of image forming devices to the image forming device specified by the unique device information.

4. The non-transitory computer-readable medium according to claim 1, wherein the programmed instructions further cause the computer to perform predetermined encryption processing on the information, and provide the encrypted information to the image forming device.

5. The non-transitory computer-readable medium according to claim 1, wherein the information acquired from the server has been subjected to predetermined encryption processing, and the programmed instructions further cause the computer to provide the encrypted information to the image forming device.

6. The non-transitory computer-readable medium according to claim 1, wherein the programmed instructions further cause the computer to display an error on a display in response to a determination that the information is unchangeable.

7. The non-transitory computer-readable medium according to claim 1, wherein the image forming device includes a plurality of image forming devices, the programmed instructions further cause the computer to:
register the plurality of image forming devices; and
display, on a display, a selection screen for selecting image forming devices to which the information is to be provided, from among the plurality of registered image forming devices, and sequentially provide the information to the image forming devices selected on the selection screen.

8. The non-transitory computer-readable medium according to claim 7, wherein the programmed instructions further cause the computer to display a predetermined transmission error screen on the display when it is difficult to transmit the information to an image forming device selected on the selection screen because a wireless communication line is disconnected.

9. The non-transitory computer-readable medium according to claim 7, wherein the programmed instructions further cause the computer to perform connection checking for determining whether wireless communication to each of the plurality of registered image forming devices is possible, and display an image forming device for which wireless communication is determined to be possible by the wireless communication control, on the selection screen.

10. The non-transitory computer-readable medium according to claim 7, wherein the programmed instructions further cause the computer to display, on the display, a radio field strength designation screen for designating radio field strength of an image forming device to be displayed on the selection screen, and form the selection screen with an image forming device having radio field strength equal to or higher than radio field strength designated on the radio field strength designation screen, and display the selection screen on the display.

11. The non-transitory computer-readable medium according to claim 1, wherein the programmed instructions further cause the computer to request the image forming device to authenticate a user, and provide the information acquired from the server to the image forming device when a user authentication result indicating that the user is an authorized user is obtained from the image forming device.

12. The non-transitory computer-readable medium according to claim 1, wherein the programmed instructions further cause the computer to change predetermined information in the information acquired from the image forming device in response to change operation, and provide the changed information to the image forming device through the wireless communication control.

13. The non-transitory computer-readable medium according to claim 12, wherein the predetermined information acquired from the image forming device is updatable.

14. The non-transitory computer-readable medium according to claim 12, wherein the information changed and transmitted to the image forming device is used to update the information in the image forming device only when updating of the information by the image forming device is allowed.

15. The non-transitory computer-readable medium according to claim 12, wherein the programmed instructions further cause the computer to display an error on a display when the information on the image forming device is unchangeable, and the image forming device is configured to transmit prohibition setting information indicating prohibition of change of the information in response to receiving the information determined to be changeable, when prohibition setting to prohibit the change of the information is made, and to display an error on the display in response to receiving the prohibition setting information from the image forming device.

16. An information processing device comprising:
memory storing computer readable instructions; and
one or more processors configured to execute the computer-readable instructions such that the one or more processors are configured to perform operations including,
controlling wireless communication so as to connect to an image forming device by wireless communication;
acquiring unique device information from the image forming device through the wireless communication control;
acquiring, from a server, predetermined information to be supplied to the image forming device specified by the acquired device information; and
providing the information acquired from the server to the image forming device through the wireless communication control, wherein the one or more processors further cause the information processing device to change predetermined information acquired from the server in response to change operation, and provide the changed information to the image forming device through the wireless communication control, and wherein the programmed instructions further cause the information processing device to determine whether the information is changeable based on predetermined reference setting information, and provide information determined to be changable, to the image forming device through the wireless communication control.

17. An information processing system comprising:
an image former configured to reflect provided information in the image forming device;
a server configured to distribute the information to be reflected in the image former; and
an information terminal configured to provide the information acquired from the server to the image former through a wireless communication line, wherein the information terminal includes:
a memory and at least one processor configured to control wireless communication so as to connect to the image former by wireless communication;

acquire unique device information from the image former through the wireless communication control;

acquire, from the server, predetermined information to be supplied to the image former is specified by the acquired device information; and provide the information acquired from the server to the image former through the wireless communication control, wherein the programmed instructions further cause the information terminal to change predetermined information acquired from the server in response to change operation, and provide the changed information to the image former through the wireless communication control, and wherein the programmed instructions further cause the information terminal to determine whether the information is changeable based on predetermined reference setting information, and provide information determined to be changeable, to the image former through the wireless communication control.

* * * * *